US006980524B1

(12) United States Patent
Lu et al.

(10) Patent No.: US 6,980,524 B1
(45) Date of Patent: Dec. 27, 2005

(54) METHODS AND APPARATUS FOR ROUTING IN A MOBILE AD HOC NETWORK

(75) Inventors: I-Tai Lu, Dix Hills, NY (US); Mario Joa-Ng, Iselin, NJ (US)

(73) Assignee: Polytechnic University, Brooklyn, NY (US)

( * ) Notice: Subject to any disclaimer, the term of this patent is extended or adjusted under 35 U.S.C. 154(b) by 0 days.

(21) Appl. No.: 09/575,884

(22) Filed: May 22, 2000

Related U.S. Application Data

(60) Provisional application No. 60/134,994, filed on May 20, 1999.

(51) Int. Cl.[7] ............................................. H04L 12/28
(52) U.S. Cl. ..................... 370/254; 455/408; 455/456.1
(58) Field of Search ............................... 370/248–255, 370/389–395.6, 465, 535, 428, 466–473, 370/284, 331, 221; 709/223, 22, 315, 328; 342/354, 357; 455/12.1, 13.1–13.4, 429, 455/428, 456.1, 503, 408, 458, 456, 456.2

(56) References Cited

U.S. PATENT DOCUMENTS

| | | | |
|---|---|---|---|
| 5,442,684 A * | 8/1995 | Hashimoto et al. ...... 455/456.1 |
| 5,548,585 A * | 8/1996 | Lagoutte et al. ............. 370/469 |
| 5,881,050 A * | 3/1999 | Chevalier et al. ........... 370/230 |
| 5,883,893 A * | 3/1999 | Rumer et al. ............. 370/395.6 |
| 6,085,102 A * | 7/2000 | Dorenbosch ................ 455/503 |
| 6,122,522 A * | 9/2000 | Lee .............................. 455/458 |
| 6,233,610 B1 * | 5/2001 | Hayball et al. ............. 709/223 |
| 6,249,241 B1 * | 6/2001 | Jordan et al. .................. 342/41 |
| 6,256,295 B1 * | 7/2001 | Callon ......................... 370/254 |
| 6,269,076 B1 * | 7/2001 | Shamir et al. .............. 370/217 |
| 6,330,454 B1 * | 12/2001 | Verdonk .................. 455/456.2 |
| 6,332,075 B1 * | 12/2001 | Verdonk ..................... 455/408 |
| 6,335,921 B1 * | 1/2002 | Quinquis et al. ........... 370/331 |
| 6,493,344 B1 * | 12/2002 | Brueckheimer et al. . 370/395.1 |
| 6,580,721 B1 * | 6/2003 | Beshai ........................ 370/428 |
| 6,801,496 B1 * | 10/2004 | Saleh et al. ................. 370/221 |
| 6,850,486 B2 * | 2/2005 | Saleh et al. ................. 370/218 |
| 6,856,627 B2 * | 2/2005 | Saleh et al. ................. 370/397 |

\* cited by examiner

*Primary Examiner*—Chi Pham
*Assistant Examiner*—Prenell Jones
(74) *Attorney, Agent, or Firm*—Straub & Pokotylo; John C. Pokotylo

(57) ABSTRACT

A "peer-to-peer" hierarchical routing protocol—also referred to as Zone-based Hierarchical Link State Routing protocol (or "ZHLS")—which incorporates location information into a novel "peer-to-peer" hierarchical routing approach. The network may be divided into non-overlapping zones. Aggregating nodes into zones conceals the detail of the network topology. Initially, each node knows its own position and therefore zone ID through a position determination unit, such as a Global Positioning System (GPS). After the network is established, each node knows the low level (node level) topology about node connectivity within its zone and the high level (zone level) topology about zone connectivity of the whole network. A packet may be forwarded by specifying the hierarchical address—zone ID and node ID—of a destination node in the packet header.

19 Claims, 20 Drawing Sheets

100

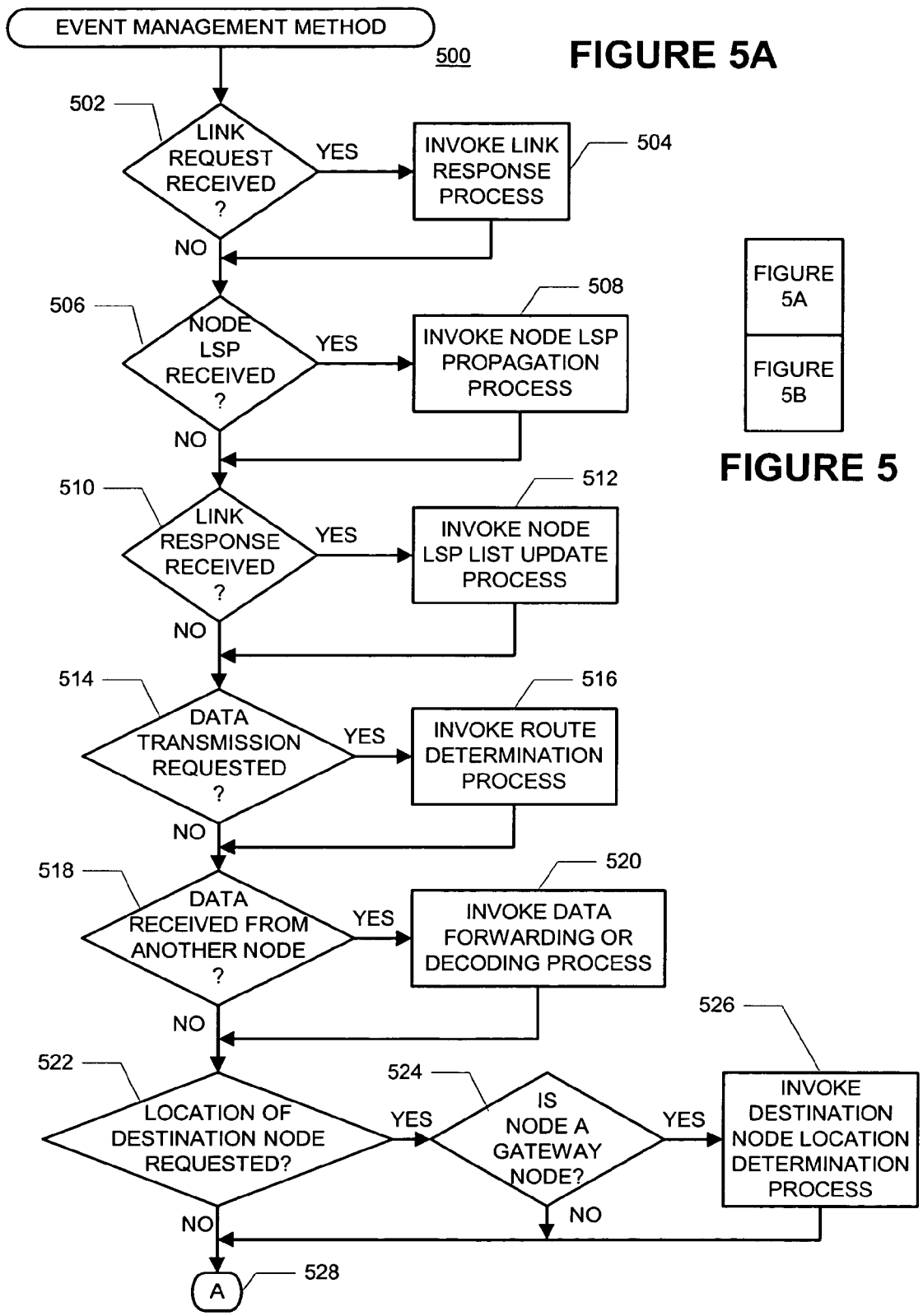

| NODE LSPs | |
|---|---|
| ZONE IDENTIFIER | — 1020 |
| SOURCE NODE 1 | NODES AND ZONES "CONNECTED WITH" SOURCE NODE 1 | ← 1030a |
| SOURCE NODE 2 | NODES AND ZONES "CONNECTED WITH" SOURCE NODE 2 | ← 1030b |
| . . . | . . . | |
| SOURCE NODE n | NODES AND ZONES "CONNECTED WITH" SOURCE NODE n | ← 1030c |

| INTRA-ZONE ROUTING TABLE | |
|---|---|
| NODE (ZONE) IDENTIFIER | — 1610 |
| DESTINATION NODE/ZONE | NEXT NODE | ← 1620a |
| DESTINATION NODE/ZONE | NEXT NODE | ← 1620b |
| . . . | . . . | |
| DESTINATION NODE/ZONE | NEXT NODE | ← 1620c |

| NODE LSPs | |
|---|---|
| ZONE 1 | |
| a | b,c,d,4 |
| b | a,e |
| c | a,3 |
| d | a |
| e | b,f,2 |
| f | e,2 |

| INTRA-ZONE ROUTING TABLE | |
|---|---|
| NODE a | |
| b | b |
| c | c |
| d | d |
| e | b |
| f | b |
| 2 | b |
| 3 | c |
| 4 | g |

| ZONE LSPs ||
|---|---|
| SOURCE ZONE 1 | ZONE 1 LSP |
| SOURCE ZONE 2 | ZONE 2 LSP |
| . . . | . . . |
| SOURCE ZONE n | ZONE n LSP |

| INTER-ZONE ROUTING TABLE | | |
|---|---|---|
| NODE IDENTIFIER | | |
| DESTINATION ZONE | NEXT ZONE | NEXT NODE |
| DESTINATION ZONE | NEXT ZONE | NEXT NODE |
| . . . | . . . | . . . |
| DESTINATION ZONE | NEXT ZONE | NEXT NODE |

| ZONE LSPs | |
|---|---|
| 1 | 2,3,4 |
| 2 | 1,6 |
| 3 | 1,7,8 |
| 4 | 1,9 |
| 5 | 6,9 |
| 6 | 2,5 |
| 7 | 3 |
| 8 | 3 |
| 9 | 4,5 |

| INTER-ZONE ROUTING TABLE | | |
|---|---|---|
| NODE a | | |
| 2 | 2 | b |
| 3 | 3 | c |
| 4 | 4 | g |
| 5 | 4 | g |
| 6 | 2 | b |
| 7 | 3 | c |
| 8 | 3 | c |
| 9 | 4 | g |

1822' / 1824' / 1826'

1810'

1820' (×8)

METHODS AND APPARATUS FOR ROUTING IN A MOBILE AD HOC NETWORK

§ 1. RELATED APPLICATION(S)

Benefit is claimed, under 35 U.S.C. § 119(e)(1), to the filing date of provisional patent application Ser. No. 60/134,994, entitled "ZONE-BASED HIERARCHICAL LINK STATE ROUTING FOR MOBILE AD-HOC WIRELESS NETWORK", filed on May 20, 1999 and listing I-Tai Lu and Mario Joa-Ng as inventors, for any inventions disclosed in the manner provided by 35 U.S.C. § 112, ¶ 1. This provisional application is expressly incorporated herein by reference.

§ 2. BACKGROUND

§ 2.1 Field of the Invention

The present invention concerns communicating information in a mobile ad hoc network. More specifically, the present invention concerns determining a state of a node in an ad hoc network, determining a topological state of the ad hoc network and/or using the determined node and network topology states to route (e.g., forward) communications to a destination node.

§ 2.2 Related Art

The present invention may be used in a mobile ad hoc network environment. Although mobile ad hoc networks are known to those skilled in the art, they are introduced in § 2.2.1 for the reader's convenience. Then, § 2.2.2 introduces known network architectures and routing protocols, as well as disadvantages and limitations of such known architectures and protocols as perceived by the inventors. Finally, § 2.2.3 introduces needs that have not been met by such known architectures and protocols.

§ 2.2.1 Mobile Ad Hoc Networks

As introduced above, the present invention may operate in the environment of a mobile ad hoc network. A mobile ad hoc network is a self-organizing and rapidly deployable network in which neither a wired backbone nor a centralized control is needed. Thus, a mobile ad hoc network is adaptable to the highly dynamic topology resulting from the mobility of network nodes and changing propagation conditions. The nodes of a mobile ad hoc network may communicate with one another over scarce wireless channels in a multi-hop manner. Thus, in addition to performing transmission and reception functions, the mobile nodes may perform a routing (e.g., data or message forwarding) function.

Having introduced mobile ad hoc networks, known network architectures and routing protocols are introduced in § 2.2.2 below.

§ 2.2.2 Network Architectures and Routing Protocols

Since the routing protocol to be used in an ad hoc network is typically affected by the network architecture, various network architectures are introduced first in § 2.2.2.1 below. There are two (2) basic categories of network architectures—flat and hierarchical. Each is introduced below.

§ 2.2.2.1 An Overview of Known Network Architectures Used in Mobile Ad HOC Networks In hierarchical network architectures (See, e.g., the hierarchical spine routing protocol discussed in the articles: B. Das and V. Bharghavan, "Routing in Ad-Hoc Networks Using Minimum Connected Dominating Sets," *IEEE ICC'97*, June 1997; and B. Das, R. Sivakumar and V. Bharghavan, "Routing in Ad Hoc Networks Using a Virtual Backbone," *IEEE IC3N'97*, September 1997, pp. 1–20.), details of the network topology are concealed by aggregating nodes into clusters, aggregating clusters into superclusters, and so on (See, e.g., the article [4] G. S. Lauer, "Packet-Radio Routing," M. E. Steenstrup, editors, *Routing in Communications Networks*, Prentice-Hall, 1995, pp. 375–379.). Some nodes serve as "cluster heads" and "gateway nodes". In this way, control messages may only have to be propagated within a cluster. Thus, such hierarchical architectures are advantageous in that they reduce the storage requirements and communications overhead in large wireless networks. However, the cluster head nodes and gateway nodes have a greater computation and communication burden than other nodes. This complicates mobility management. Further, by concentrating critical functions at cluster head nodes and gateway nodes, network reliability can be greatly affected by the reliability of a few critical nodes. The failure of such nodes can lead to catastrophic failure of the network.

In flat network architectures, all nodes carry the same responsibilities. Thus, such architectures avoid catastrophic failures and spread computational and storage burdens more fairly. Unfortunately, however, flat network architectures use bandwidth resources inefficiently since control messages are propagated globally, throughout the network. This limits the scalability of flat network architectures.

Having introduced the basic types of network architectures which may be used in a mobile ad hoc network, various routing protocols which may be used in a mobile ad hoc network are introduced in § 2.2.2.2 below.

§ 2.2.2.2 An Overview of Known Routing Protocols and Schemes Used in Mobile Ad Hoc Networks There are two (2) basic categories of routing protocols—proactive versus reactive. Each is introduced below.

In proactive routing schemes, nodes continuously maintain complete routing information of the network. In this way, when a node needs to forward a packet, the route is available ahead of time (hence the term "proactive"). This scheme therefore avoids delays that would otherwise occur in searching for a route. Unfortunately, however, in highly dynamic (i.e., rapidly changing) network topologies, proactive routing schemes require a significant amount of scarce wireless communications resources (or bandwidth) to maintain current and complete routing information.

Proactive protocols such as the link state routing protocol (also referred to as "open shortest path first") (See, e.g., the article, R. Perlman, *Interconnections: Bridges and Routers*, Addison-Wesley, 1992, pp. 149–152 and pp. 205–233.) and the distance vector routing protocol (also referred to as "Bellman-Ford") (See, e.g., the article, R. Perlman, *Interconnections: Bridges and Routers*, Addison-Wesley, 1992, pp. 149–152 and pp. 205–233.) were not designed to work in mobile networks (See, e.g., the article, J. P. Macker and M. S. Corson, "Mobile Ad Hoc Networking and the IETF," *ACM Mobile Comput. and Commun. Rev.*, Vol. 2, No. 1, January 1998, pp. 9–14.) The inventors believe that these protocols do not converge fast enough for networks having a rapidly changing topology. Other distance vector routing protocols, such as the destination-sequenced distance vector routing protocol (See, e.g., the article, C. E. Perkins and P. Bhagwat, "Highly Dynamic Destination-Sequenced Distance-Vector Routing (DSDV) for Mobile Computers," *ACM Comput. Commun. Rev.*, Vol. 24, No. 4, (ACM SIGCOMM'94) October 1994, pp. 234–244.) and the wireless routing protocol (See, e.g., the article, S. Murthy and J. J. Garcia-Luna-Aceves, "An Efficient Routing Protocol for Wireless Networks," *ACM Mobile Networks and Applications J.*, Vol. 1, No. 2, 1996, pp. 183–197.) were proposed to eliminate counting to infinity and looping problems of the distributed Bellman-Ford algorithm.

In reactive schemes, nodes only maintain routes to active destinations. A route search is needed for every new destination. Examples of reactive protocols include the ad hoc on demand distance vector routing protocol (See, e.g., the article, C. E. Perkins, "Ad Hoc On Demand Distance Vector (AODV) Routing," Internet Draft, November 1997.), the temporally-ordered routing algorithm (See, e.g., the article, V. D. Park and M. S. Corson, "A Highly Adaptive Distributed Routing Algorithm for Mobile Wireless Networks," *IEEE INFOCOM'97*, Kobe, Japan, April 1997.) and the dynamic source routing protocol (See, e.g., the article, D. B. Johnson and D. A. Maltz, "Dynamic Source Routing in Ad Hoc Wireless Networks," T. Imielinski and H. Korth, editors, *Mobile Computing*, Kluwer, 1996.). Although communication/overhead is reduced when reactive schemes are used instead of proactive schemes, unfortunately, communications are delayed due to route searching. Also, an active route may be broken, causing the need for a subsequent route search. This problem is exacerbated in networks having rapidly changing topologies.

Some routing protocols or schemes are basically hybrids of the proactive and reactive schemes. One example of such a hybrid routing protocol is referred to as the zone routing protocol (or "ZRP") (See, e.g., the articles: M. R. Pearlman and Z. J. Haas, "The Performance of the Zone Routing Protocol in Reconfigurable Wireless Networks," *IEEE J. Select. Areas Commun.*, Vol. 17, No. 8, August 1999, pp. 1395–1414; Z. J. Haas and M. R. Pearlman, "The Performance of Query Control Scheme for the Zone Routing Protocol," *ACM SIGCOMM'98*, Vancouver, Canada, 1998; and Z. J. Haas, "The Zone Routing Protocol (ZRP) for Ad Hoc Networks," Internet Draft, November 1997.).

Other ad hoc routing protocols have been discussed (See, e.g., the articles: M. Gerla and J. T. Tsai, "Multicluster, Mobile, Multimedia Radio Network," *ACM Wireless Networks*, Vol. 1, No. 3, 1995, pp. 255–265; D. J. Baker, A. Ephremides and J. A. Flynn, "The Design and Simulation of a Mobile Radio Network with Distributed Control," *IEEE J. Select. Areas Commun.*, Vol. SAC-2, No. 1, January 1984, pp. 226–237; A. Ephremides, J. E. Wieselthier and D. J. Baker, "A Design Concept for Reliable Mobile Radio Networks with Frequency Hopping Signaling," *Proc. IEEE*, Vol. 75, No. 1, January 1987, pp. 56–73; and J. Sharony, "An Architecture for Mobile Radio Networks with Dynamically Changing Topology Using Virtual Subnets," *ACM Mobile Networks and Applications J.*, Vol. 1, No. 1, 1996, pp. 75–86.).

In the zone routing protocol (ZRP), each node proactively maintains the topological information within its routing zone (e.g., within a predefined distance) only. Thus, the zone routing protocol (ZRP) is proactive within a zone. For routing outside a node's routing zone, the zone routing protocol (ZRP) employs "bordercasting". "Bordercasting" exploits the structure of the routing zone by allowing a node to send messages to nodes on the boundary of its routing zone (such nodes may be referred to as "peripheral nodes") and by preventing non-peripheral nodes from accessing the messages. Routes are efficiently discovered by bordercasting a route query to all the source's peripheral nodes. These peripheral nodes, in turn, bordercast the query to their peripheral nodes if the destination node is not within the respective routing zones of the peripheral nodes, and so on. Once the destination node is found, a route reply is echoed back to the source node. Thus, the zone routing protocol (ZRP) is reactive with respect to destination nodes beyond a source node's zone. The routing path, which includes a list of peripheral nodes between the source and destination nodes, is stored in the header of a packet(s) or cached in the queried peripheral nodes. Unfortunately, any change in the peripheral nodes gives rise to the need to discover another route.

Other articles of interest may include: L. Kleinrock and F. Kamoun, "Hierarchical Routing for Large Networks: Performance Evaluation and Optimization," *Computer Networks*, Vol. 1, No. 3, 1977, pp. 155–174; J. Behrens and J. J. Garcia-Luna-Aceves, "Hierarchical Routing Using Link Vectors," *IEEE INFOCOM'98*, San Francisco, Calif., March 1998; UCLA Parallel Computing Lab, *Maisie User Manual Release* 2.2, December 1995; J. Short, R. Bagrodia, L. Kleinrock, "Mobile Wireless Network System Simulation," *Proc. ACM Mobile Commun. Network. Conf.*, Berkeley, Calif., November 1995; and M. Joa-Ng, "Routing Protocol and Medium Access Protocol for Mobile Ad Hoc Networks," Ph.D. dissertation, Department of Electrical Engineering, Polytechnic University, Brooklyn, 1999.

§ 2.2.3 Unmet Needs

In view of the foregoing, there is a need for an improved routing protocol for used in ad hoc networks. The routing protocol should use less bandwidth than purely proactive routing schemes, should provide faster route determination that purely reactive routing schemes, and should better adapt to changing network topology as well as incur less location search overhead than hybrid routing schemes.

§ 3. SUMMARY OF THE INVENTION

In one aspect of the present invention, a peer-to-peer hierarchical routing protocol which incorporates location information into a novel peer-to-peer hierarchical routing approach is disclosed. The network may be divided into non-overlapping zones, thereby concealing the details of the network topology.

Each node may determine certain details about its own state, such as the identity of the zone in which the node currently resides. Each node may then determine certain details about the state of the network, such as intra-zone information and inter-zone information. Since the network topology is not flat, these determinations do not waste transmission bandwidth. Each node may then use such information about the state of the network to build routing tables. Thus, the routing scheme of the present invention is proactive, yet, by ignoring details of other zones, it does not waste transmission bandwidth.

When a source node needs to transmit data to a destination node, the packet(s) may specify the destination node's zone identification and node identification. This two (2) level or hierarchical address information is used to forward the packet(s) to the destination node. To determine the destination node's zone identification, the source node may have to send a location request to each other zone. Hence, the routing scheme of the present invention may be proactive in cases where the destination node is in the same zone as the source node, and may be reactive in cases where the destination node is in a different zone than the source node.

In one aspect of the present invention, in a network having nodes arranged in at least two zones, a method for a particular node to determine a current partial topological state of the network is provided. The method may (a) determine a zone of the network in which the particular node resides, (b) for each node in the zone, determine nodes having a physical communication link with the node in the zone, and (c) for each zone in the network, determine zones having a virtual connection with the zone in the network.

In another aspect of the present invention, in a network having nodes arranged in at least two zones, a method for a particular node to determine a current partial topological state of the network is provided. The method may (a) determine, for each node in a zone in which the particular node resides, nodes having a physical communication link with the node in the zone, and (b) determine, for each zone in the network, zones having a virtual connection with the zone in the network.

In yet another aspect of the present invention, in a network having nodes arranged in at least two zones, a method for transmitting data from a first node in the network to a second node in the network is provided. The method may first determine whether or not the second node is in the same zone as the first node. If the second node is in the same zone as the first node, then the method may route the data towards the second node based on an intra-zone routing table. If the second node is not in the same zone as the first node, then the method may (i) transmit a location request, (ii) if a response to the location request is received, then ensure that the data is provided with a zone identifier and node identifier for the second node, and (iii) route the data based on an inter-zone routing table.

In still another aspect of the present invention, in a network having nodes arranged in at least two zones, a method for a particular node to respond to a request for the location of a destination node is provided. The method may (a) determine whether or not the destination node is in the zone of the particular node, and (b) if the zone of the destination node is in the zone of the particular node, then transmit a reply message which includes an identifier of the zone of the particular node.

In yet another aspect of the present invention, in a network having nodes arranged in at least two zones, a method for a particular node to forward data towards a destination node in a destination zone is provided. The method may first determine whether or not the destination zone of the data is the same as the zone of the particular node. If the destination zone of the data is not the same as the zone of the particular node, then the method may advance the data towards the destination zone based on an inter-zone routing table. If, on the other hand, the destination zone of the data is the same as the zone of the particular node, but that the particular node is not the destination node, then the method may advance the data towards the destination node based on an intra-zone routing table. Finally, if the destination zone of the data is the same as the zone of the particular node, and that the particular node is the destination node, then the method may read the data.

In still another aspect of the present invention, in a network having nodes arranged in at least two zones, each node may include a storage device storing (i) a value identifying one of the at least two zones in which the current node resides, (ii) a list of nodes with which the current node has a physical communications link, and (iii) a list of zones with which the one of the at least two zones has a virtual connection. The node may also include a processor which can access information stored on the storage device. The storage device may further store (iv) an intra-zone routing table, (v) an inter-zone routing table, and/or (vi) a list of zones which include a node with which the current node has a physical communications link.

Finally, in yet another aspect of the present invention, in a network having nodes arranged in at least two zones, a method for a particular node to generate intra-zone and inter-zone routing tables based on a partial topological current state of the network is provided. The method may (a) determine a zone of the network in which the particular node resides, (b) determine, for each node in the zone, nodes having a physical communication link with the node in the zone, (c) determine an intra-zone routing table from the nodes determined to have a physical communication link with the node in the zone, (d) determine, for each zone in the network, zones having a virtual connection with the zone in the network, and (e) determine an inter-zone routing table from the zones determined to have a virtual connection with the zone in the network.

§ 4. BRIEF DESCRIPTION OF THE DRAWINGS

Figure 5B:
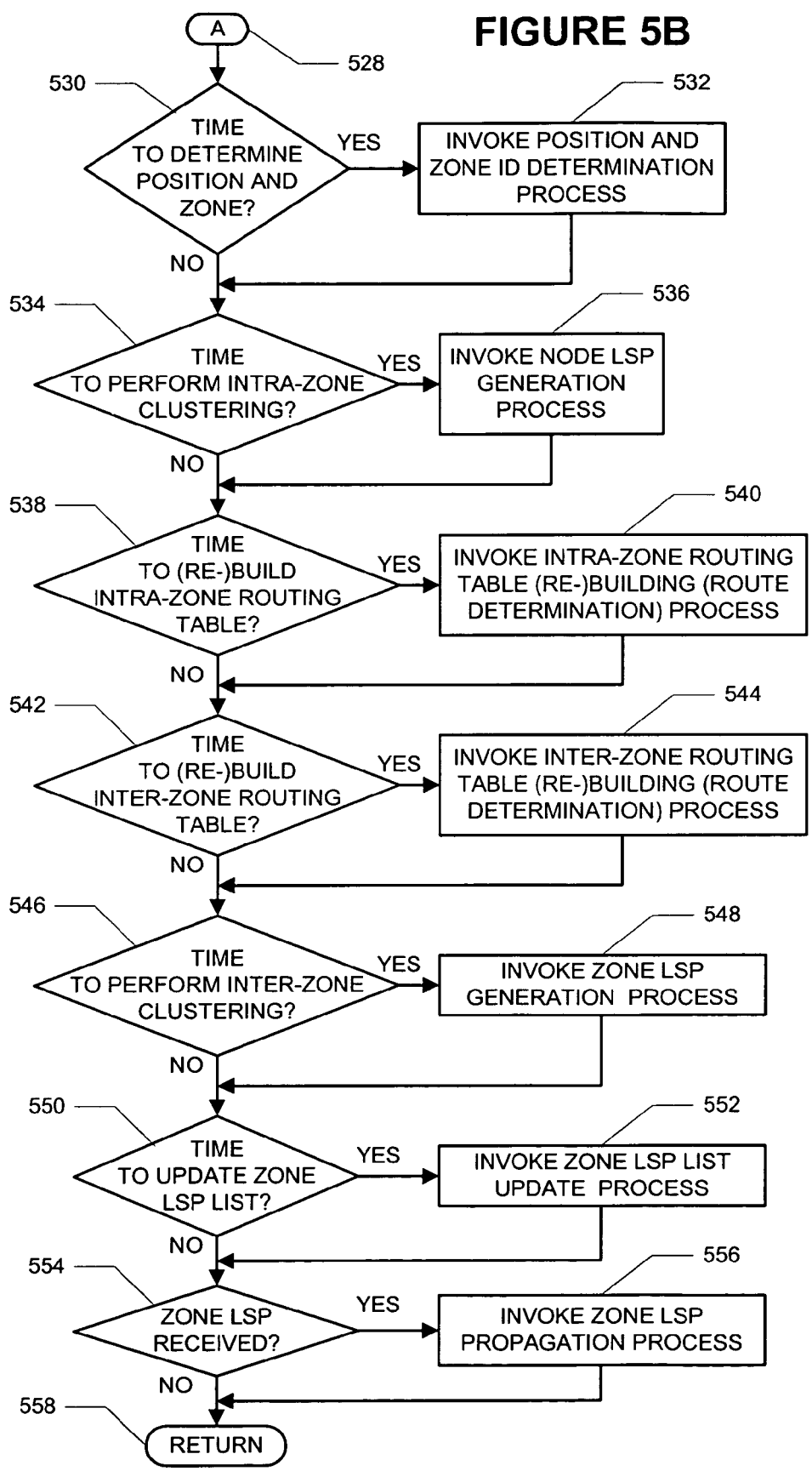

FIG. 5, which includes FIGS. 5A and 5B, is a high level flow diagram of an event management method which may be used by nodes in accordance with the present invention.

Figure 6:
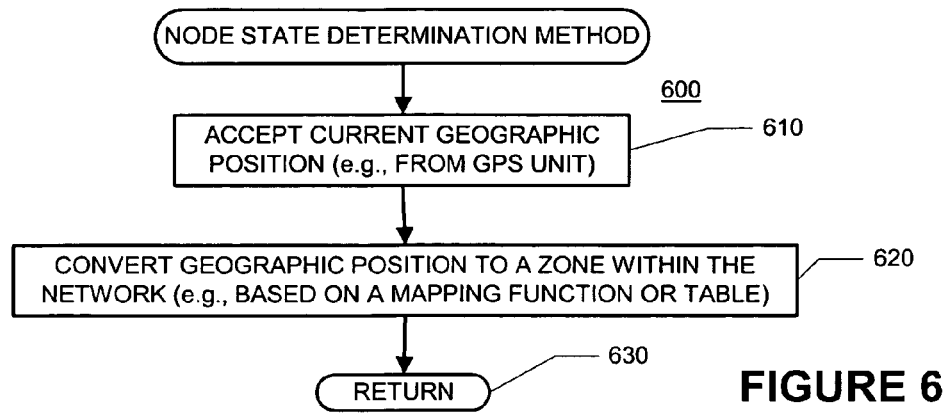

FIG. 6 is a high level flow diagram of an exemplary method which may be used to effect a node state determination process(es).

Figure 7:
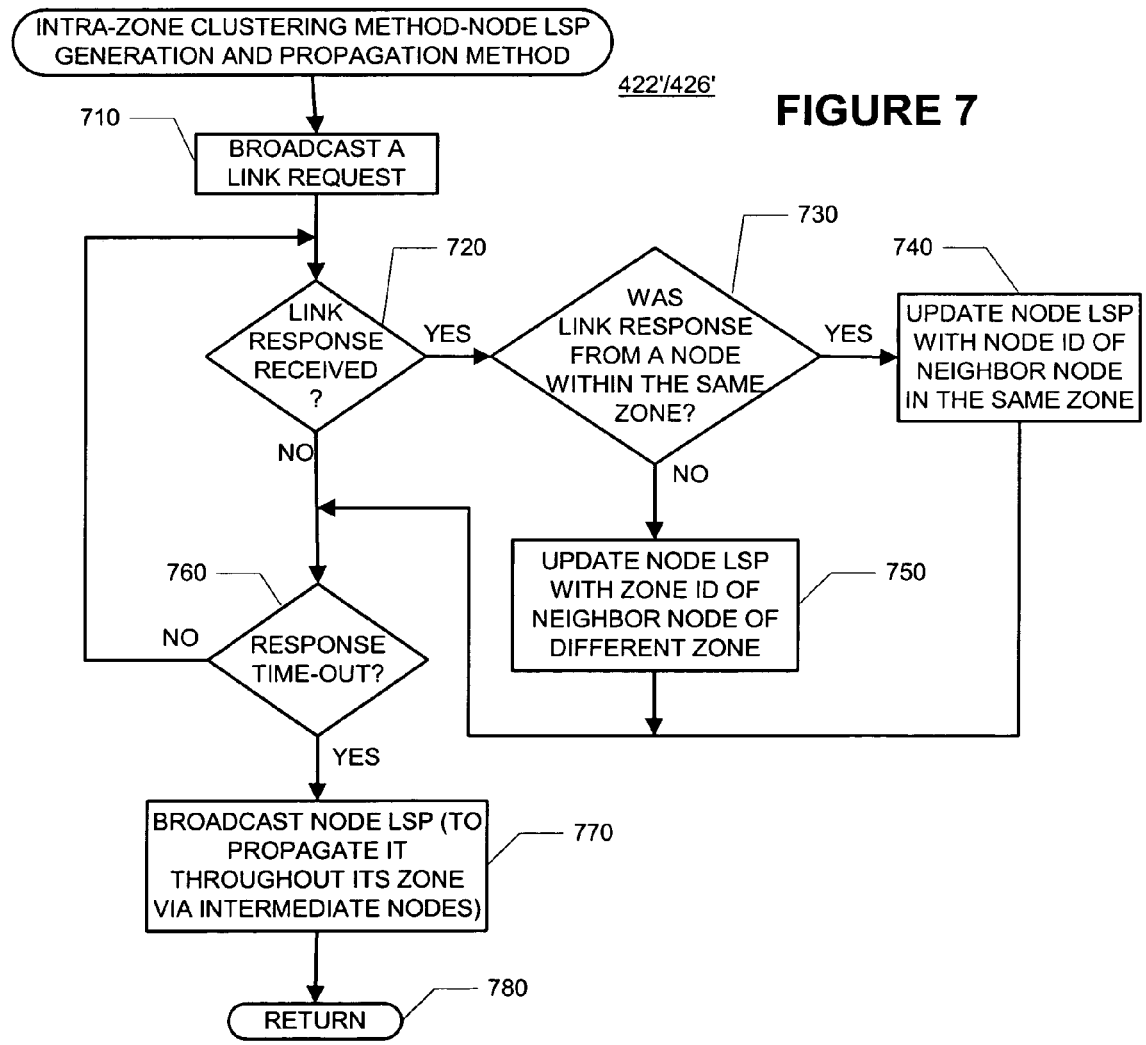

FIG. 7 is a high level flow diagram of an exemplary method which may be used to effect node LSP generation and propagation processes.

Figure 8:
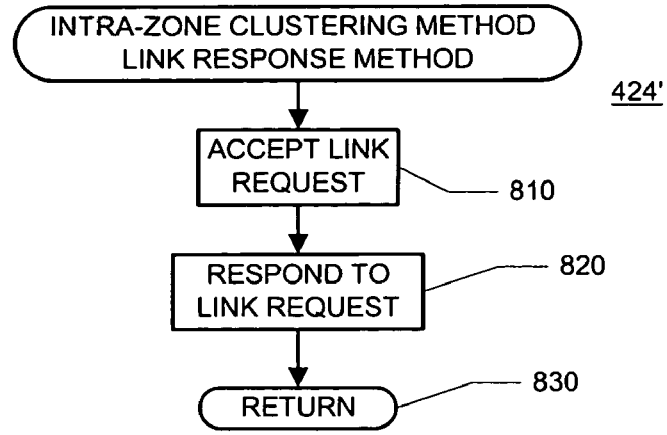

FIG. 8 is a high level flow diagram of an exemplary method which may be used to effect a link response process.

Figure 9:
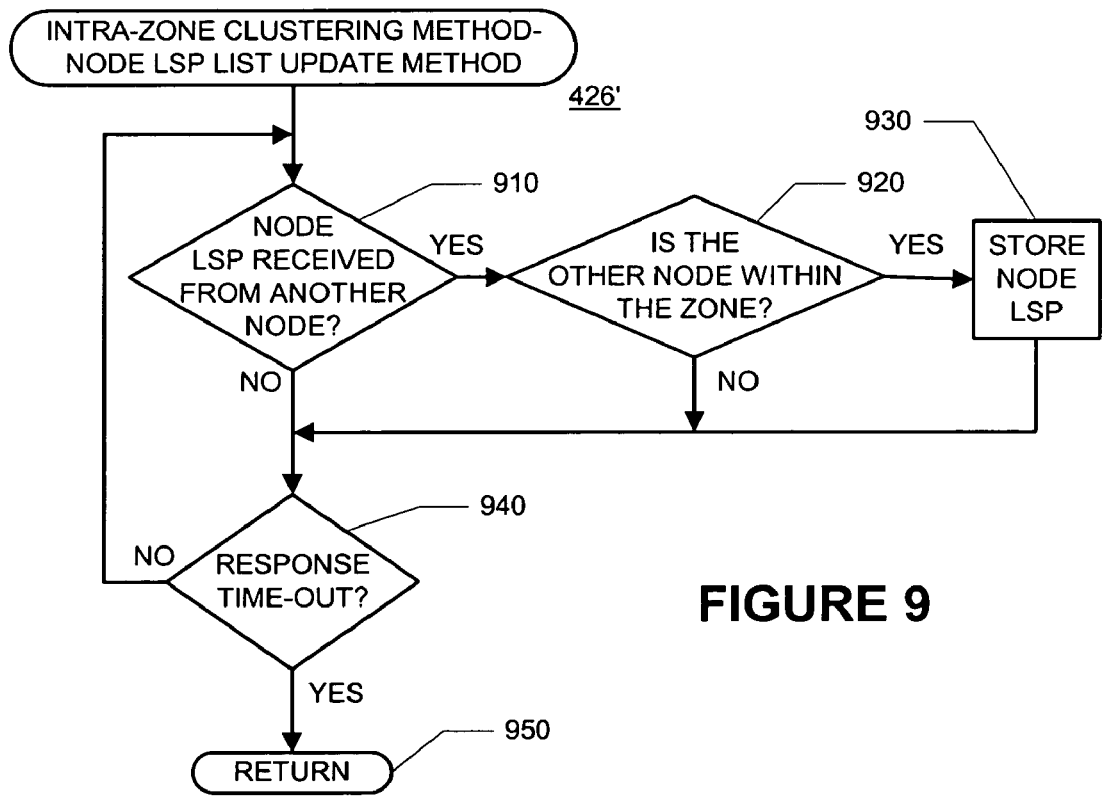

FIG. 9 is a high level flow diagram of an exemplary method which may be used to effect a node LSP list update method.

FIG. 10 is an exemplary data structure of a list of node LSPs and

Figure 1:
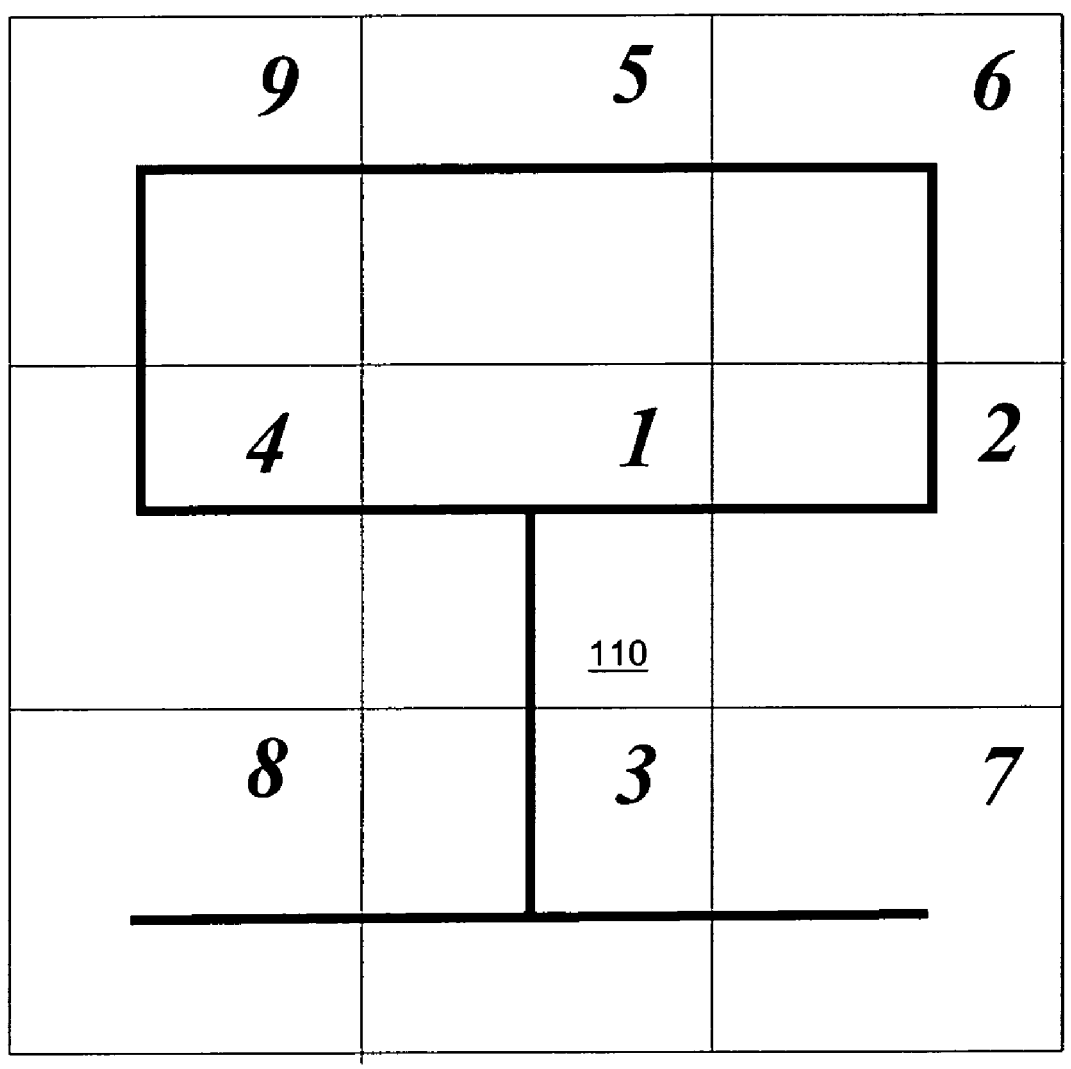
FIG. 1 is a high level diagram of virtual connections between zones in a mobile ad hoc network.
Figure 2:
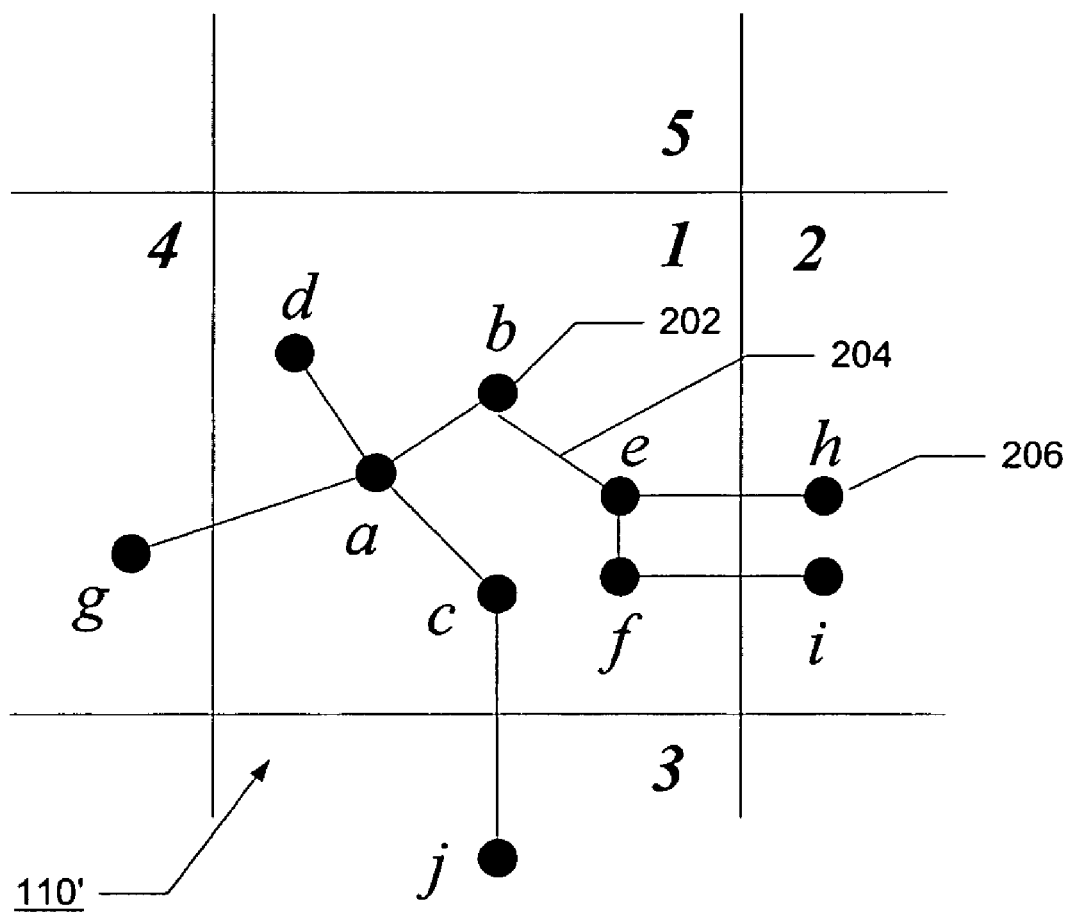
FIG. 2 is a diagram of physical communications links between nodes within a zone of the mobile ad hoc network of FIG. 1.

FIG. 11 is the data structure of FIG. 10 as populated by values based on FIGS. 1 and 2.

Figure 12:
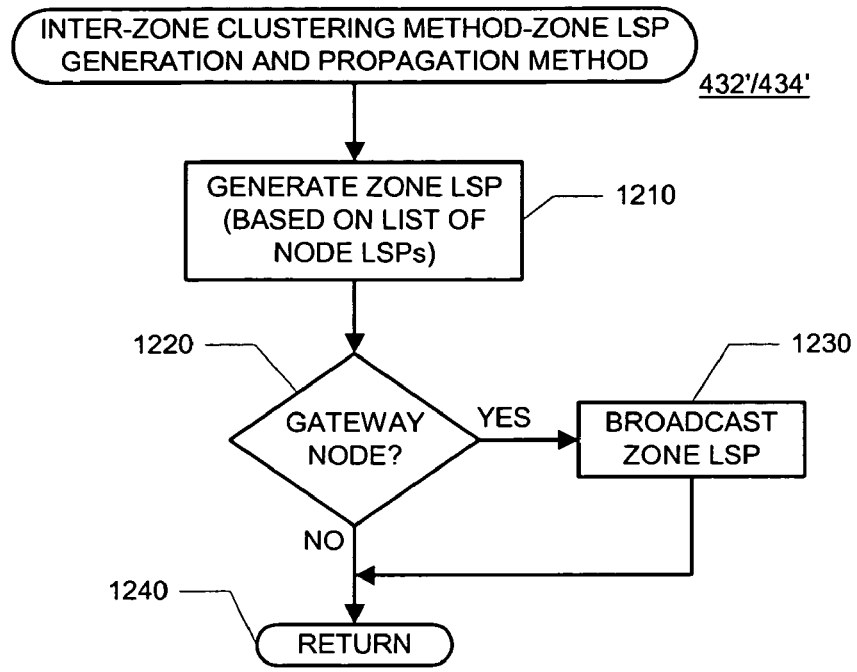

FIG. 12 is a high level flow diagram of an exemplary method which may be used to effect a zone LSP generation and propagation processes.

Figure 13:
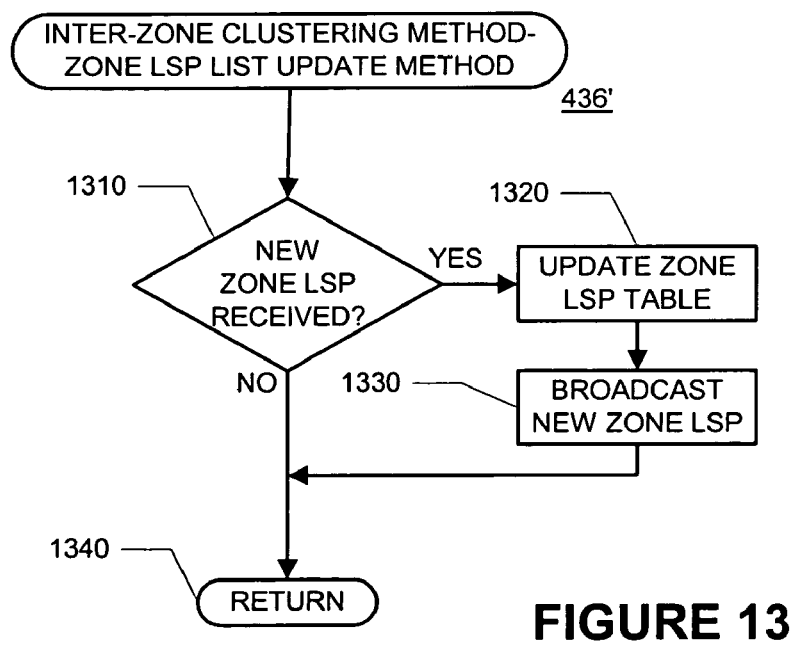

FIG. 13 is a high level flow diagram of an exemplary method which may be used to effect a zone LSP list update process.

FIG. 14 is an exemplary data structure of a list of zone LSPs and

FIG. 15 is the data structure of FIG. 14 as populated by values based on FIG. 1.

FIG. 16 is an exemplary data structure of a an intra-zone routing table and

FIG. 17 is the data structure of FIG. 16 as populated by values based on FIGS. 1 and 2.

FIG. 18 is an exemplary data structure of a an inter-zone routing table and

FIG. 19 is the data structure of FIG. 18 as populated by values based on FIGS. 1 and 2.

Figure 20:
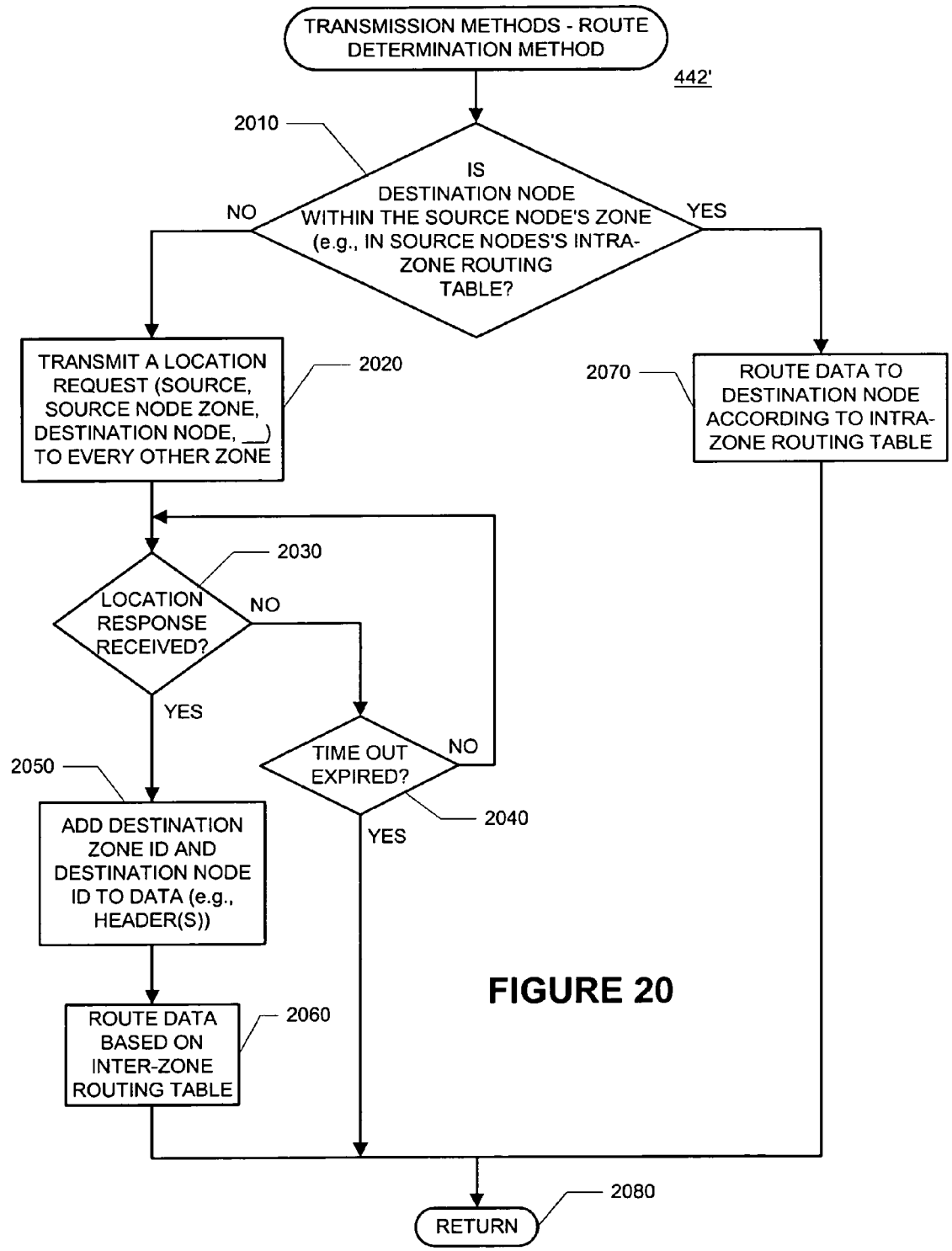

FIG. 20 is a high level flow diagram of an exemplary method which may be used to effect a route determination process.

Figure 21:
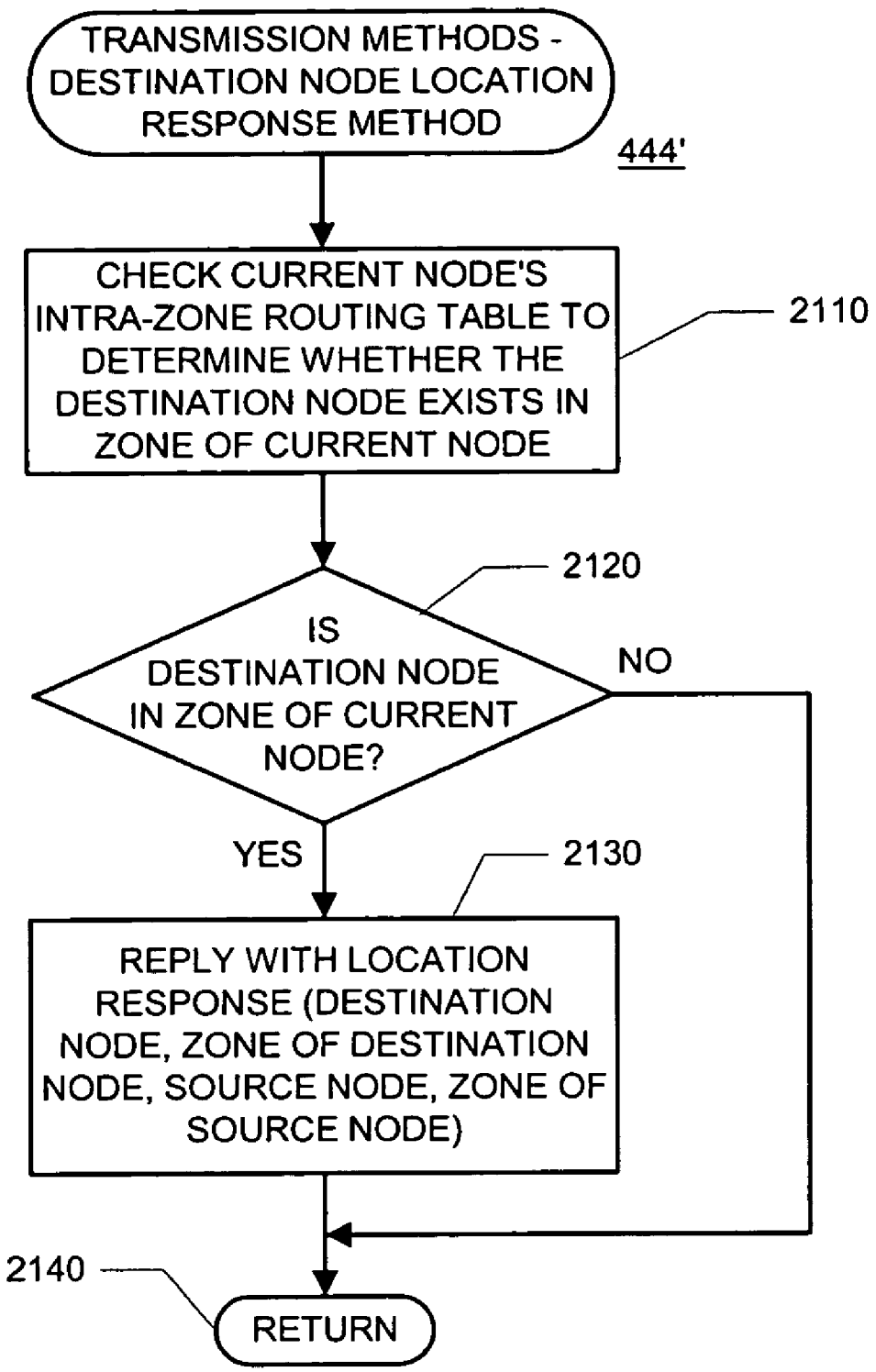

FIG. 21 is a high level flow diagram of an exemplary method which may be used to effect destination node location and response processes.

Figure 22:
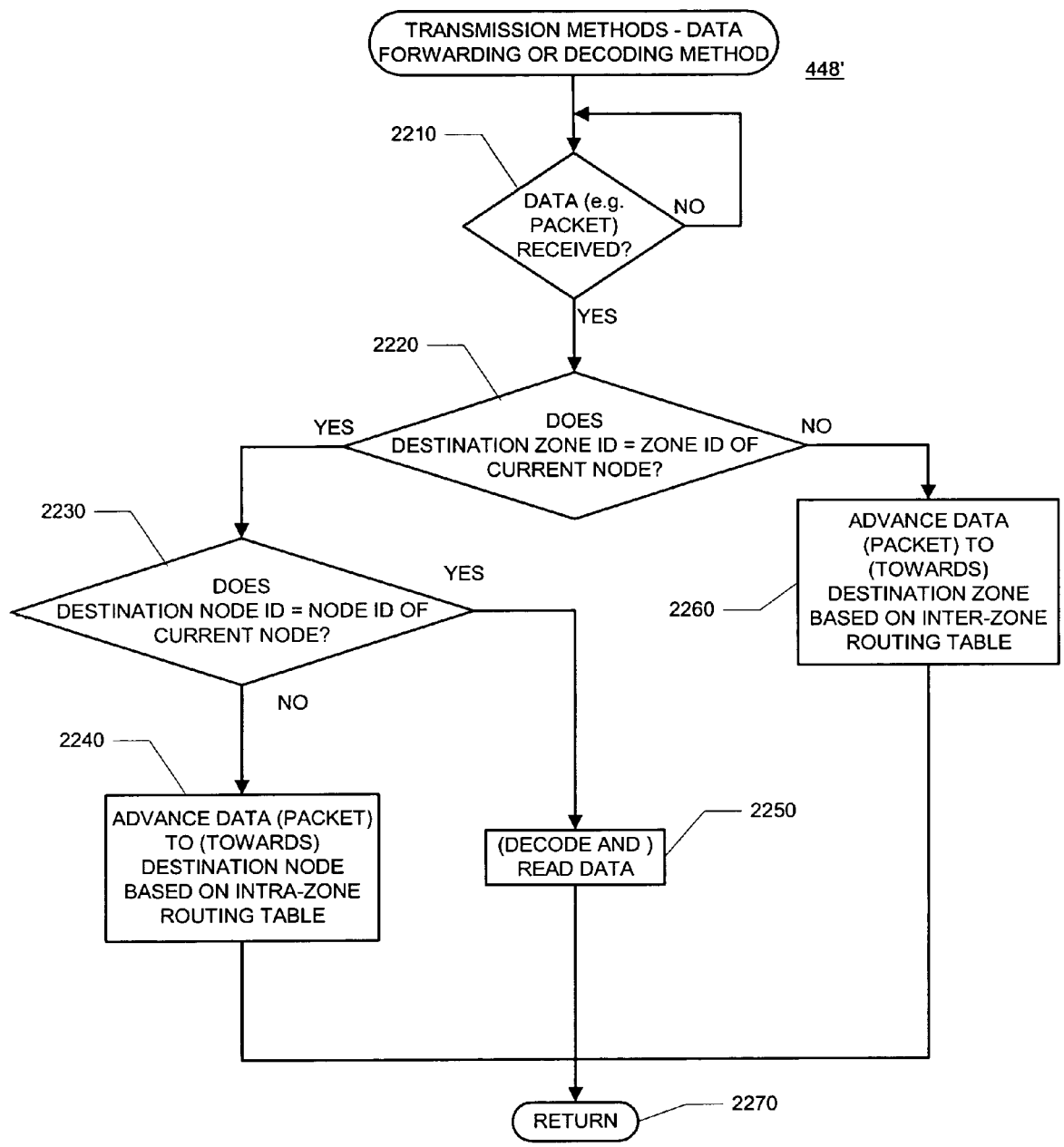

FIG. 22 is a high level flow diagram of an exemplary method which may be used to effect a data forwarding or decoding process.

FIGS. 23A through 23D illustrate an example of the operation of exemplary intra-zone clustering processes.

Figure 24B:
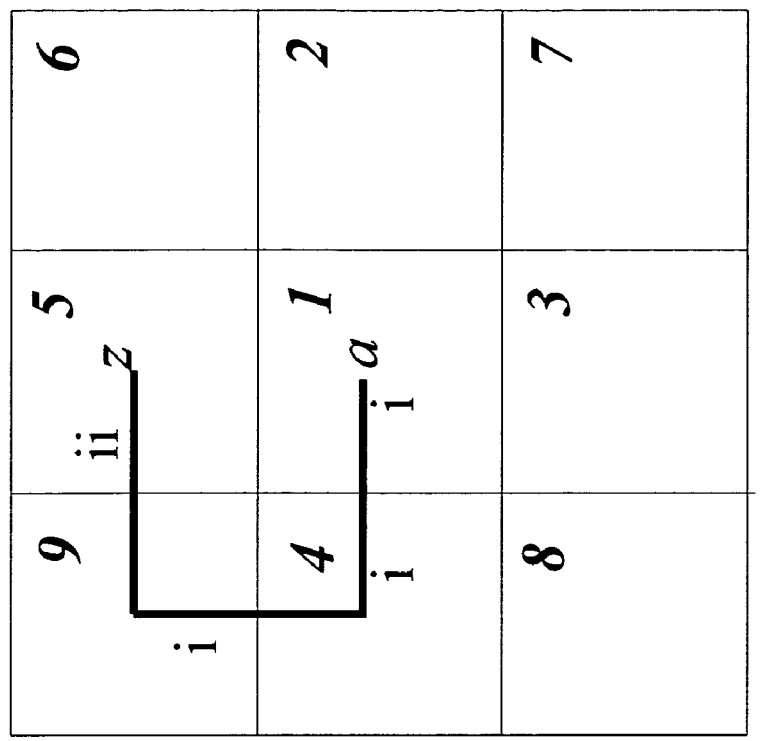
Figure 24A:
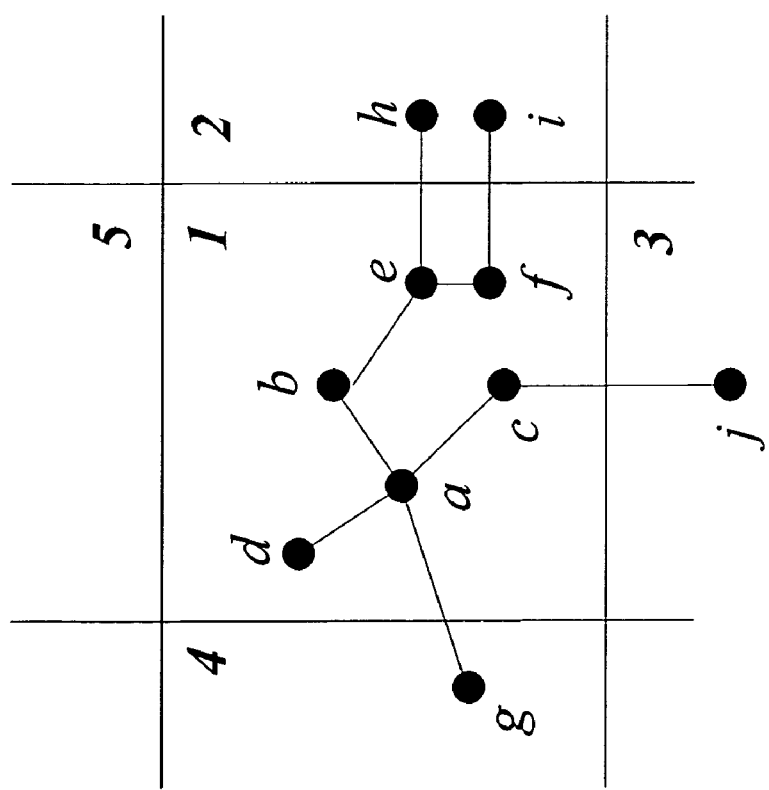

FIGS. 24A and 24B illustrate an example of how data is routing using an inter-zone routing table, and then an intra-zone routing table.

Figure 25B:
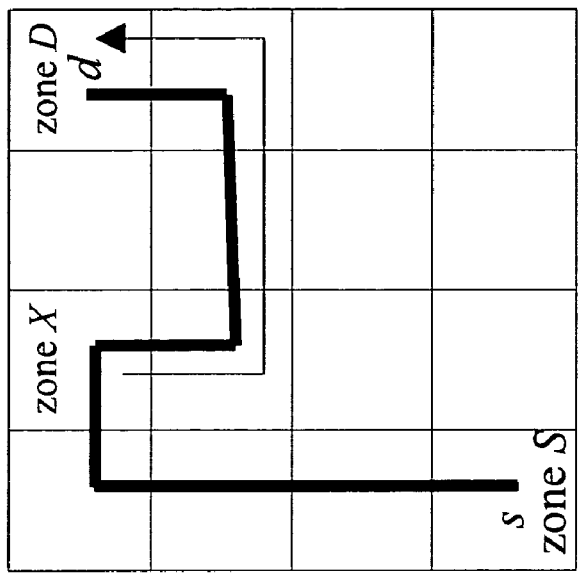
Figure 25A:
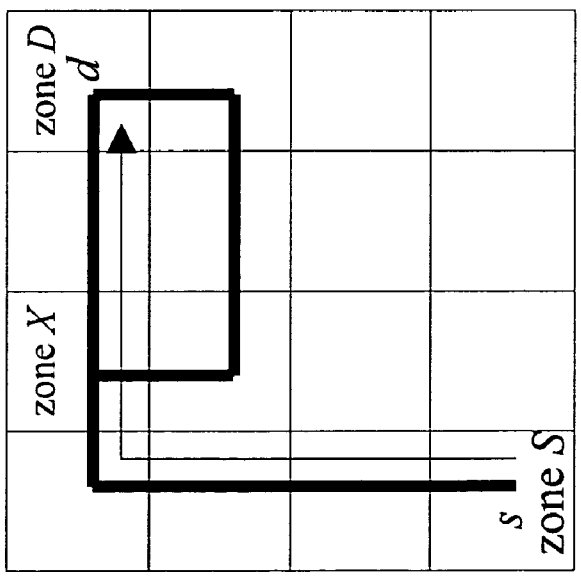

FIGS. 25A and 25B illustrate a change in virtual connections.

Figure 26:
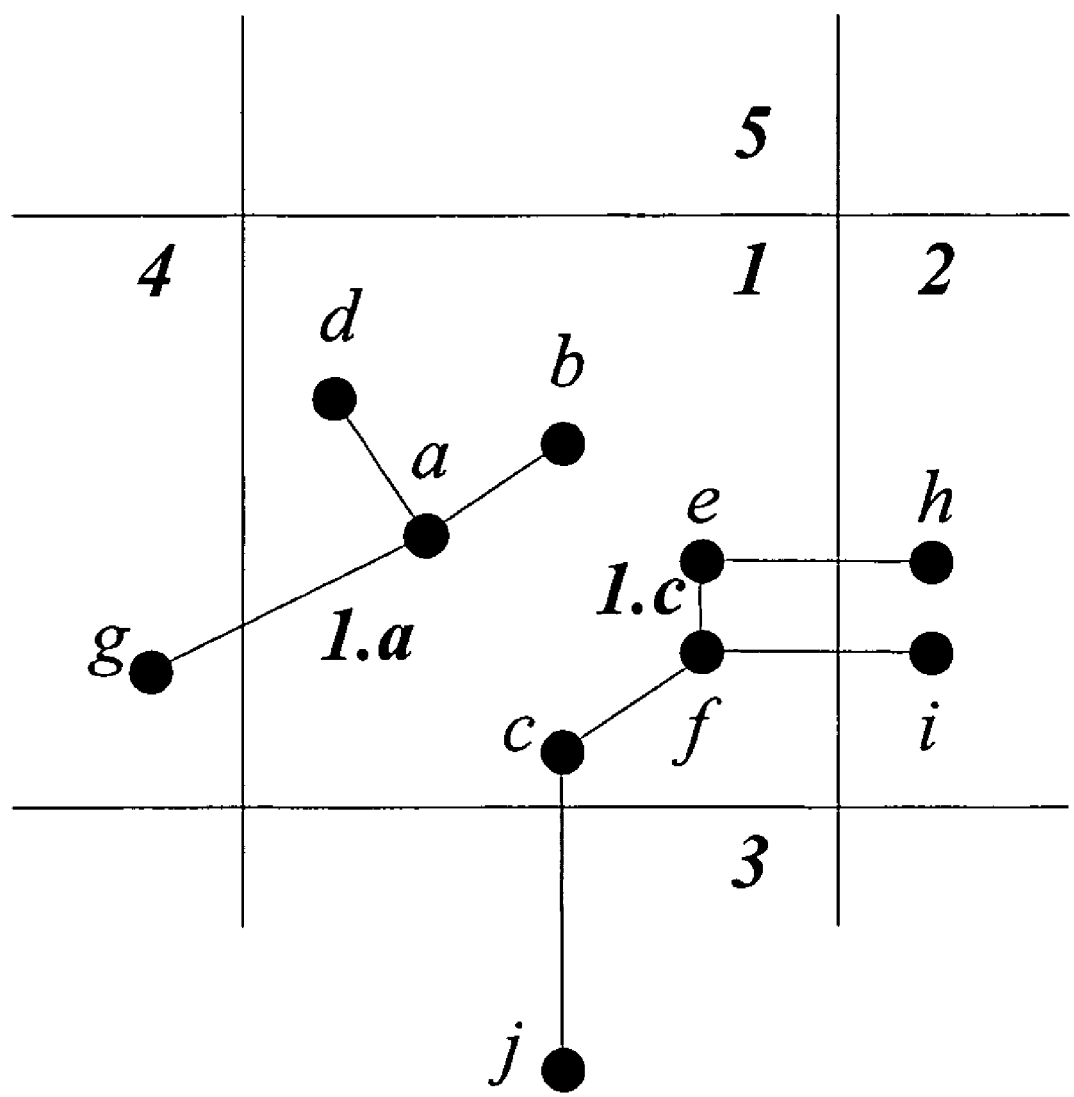

FIG. 26 illustrates multiple clusters within one zone.

§ 5. DETAILED DESCRIPTION

The present invention involves novel methods, apparatus and data structures for communicating data in a network such as a mobile ad hoc network for example. The following description is presented to enable one skilled in the art to make and use the invention, and is provided in the context of particular embodiments and methods. Various modifications to the disclosed embodiments and methods will be apparent to those skilled in the art, and the general principles set forth below may be applied to other embodiments, methods and applications. Thus, the present invention is not intended to be limited to the embodiments and methods shown and the inventors regard their invention as the following disclosed methods, apparatus and materials and any other patentable subject matter to the extent that they are patentable.

Functions which may be performed by the present invention are introduced in § 5.1 below. Then, exemplary structures, network topologies, processes, methods and data structures which may be used to effect the functions of the present invention, as well as examples of how various methods operate, are described in § 5.2. Some examples which illustrate various operations which may be performed by the present invention are set forth in § 5.3. Finally, some conclusions about the present invention are set forth in § 5.4 below.

§ 5.1 Functions of the Present Invention

The present invention may function to permit nodes of a mobile ad hoc network to learn about the topology of the network. The present invention may do so using position determination, intra-zone clustering and inter-zone clustering processes. Once a node knows its position and the topology of the network, the present invention may function to build lists of link states in the network—for example links between a node and other nodes in its zone and gateway nodes within a transmission range, as well as links between zones. The present invention may do so based on information generated pursuant to the intra-zone and inter-zone clustering processes. Once a node has lists of link states, the present invention may function to build intra-zone and inter-zone routing tables. Finally, once a node has intra-zone and inter-zone routing tables, the present invention may be used to locate a destination node and to forward data to (or towards) a destination node. The present invention may do so using location requests and replies, and by using the intra-zone and inter-zone routing tables.

§ 5.2 Exemplary Network Topologies, Structures, Processes, and Methods

In the following, an exemplary network topology which may be defined and used by the present invention is described in § 5.2.1, an exemplary architecture of a node which may be used in the present invention is described in § 5.2.2, exemplary high level processes which may be performed by the present invention are described in § 5.2.3 and exemplary methods and data structures which may be used to effect various ones of the processes are described in § 5.2.4.

§ 5.2.1 Exemplary Network Topology

Recall from the summary above that the present invention may define a two level, hierarchical network, such as a two level, hierarchical mobile ad hoc network. An example of such a network is now described below with reference to FIGS. 1 and 2.

FIG. 1 illustrates a number of zones 110 within a network 100. As illustrated in the exemplary network of FIG. 1, some zones may have direct communications links between them. (See, e.g., zones 1 and 2, 1 and 3 and 1 and 4.) The zone size may depend on factors such as node mobility, network density, transmission power and propagation characteristics. The partitioning of the network 100 into zones 110 may be based on simple geographic partitioning or on radio propagation partitioning. The geographic partitioning is much simpler and does not require any measurement of radio propagation characteristics. The radio propagation partitioning is more accurate for frequency reuse. Radio propagation partitioning is preferable if a propagation measurement can be done at the design stage. However, some applications, such as emergency disaster rescue operation, tactical military communication and law enforcement, often preclude such measurements. In such cases, a simple geographic partitioning may be used.

FIG. 2 illustrates a zone 110' within a network 100' such as a mobile ad hoc network. The zone 110, labeled "1" has adjacent zones 2, 3, 4 and 5. Within the zone, a node 202 may have physical communications (e.g., wireless communications) links 204 with other nodes. (See, e.g., node "b" which has physical communications links with nodes "a" and "e".) A node 206 of a given zone that has a physical communications link with a node outside the zone may be referred to as a "gateway node". (See, e.g., node "e" which is a gateway node for zone 1 by virtue of its physical communications link with node "h" which is outside zone 1.).

Thus, the present invention defines two (2) levels of topology: node level topology and zone level topology. If any two (2) nodes are within the communication range of one another (without the need for any intermediate nodes), a physical communications link is said to exist. The node level topology provides information on how the nodes are connected together by these physical communications links. For example, in FIG. 2, if node "a" wants to send a data packet to node "f", the data has to pass through nodes "b" and "e". If there is at least one physical communications link connecting any two (2) zones, a "virtual link" is said to exist between those two (2) zones. The exemplary zone level topology of FIG. 1 depicts how the zones are connected by these virtual links. For example, in FIG. 1, the virtual links between zone "4" and zone "3" are "4-1-3". As described below, a node 202 may use the node level topology to route a packet within a zone and may use the zone level topology to route a packet between the zones.

Having illustrated a two level hierarchical network, an exemplary node which may be used in such a network, as well as exemplary methods which may be used by such nodes, are described in §§ 5.2.2 through 5.2.4 below.

§ 5.2.2 Exemplary Node Architecture

Figure 3:
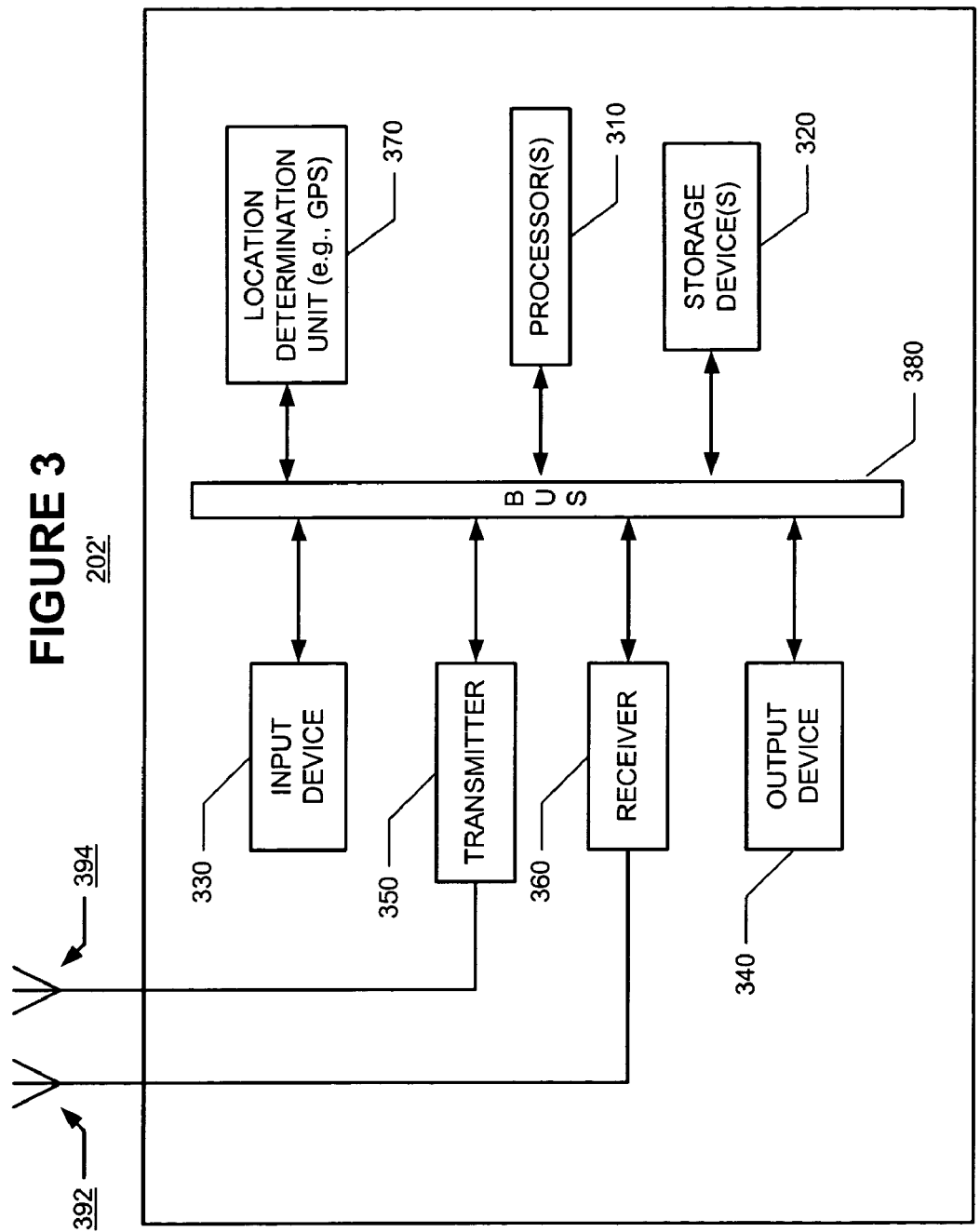
FIG. 3 is a high level block diagram of an exemplary node which may be used in the mobile ad hoc network of FIG. 1.

FIG. 3 is a high level block diagram of an exemplary node 202' which may be used. The exemplary node 202' may include a processor(s) 310 (such as general purpose microprocessors, programmable logic arrays, and/or application specific integrate circuits (or "ASICs"), for example), a storage device(s) 320 (such as RAM, ROM, shift registers, flash memory, magnetic, optical, and/or magneto optical storage media, for example), an input device(s) 330 (such as a microphone, a keypad, and/or a camera, for example), an output device(s) 340 (such as a speaker and/or a display, for example), a transmitter 350, a receiver 360, and a location determination unit 370 (such as a global positioning system or "GPS" unit for example). Two or more of these components may communicate with one another directly, and/or via a system bus or network 380. The transmitter 350 and receiver 360 may be coupled with antennas 394 and 392, respectively. The processor(s) 310 may execute program instructions which may be stored in the storage device(s) 320 and/or received via receiver 360 or input device(s) 330.

Having described an exemplary node 202', exemplary processes, and methods and data structures which may be used by such nodes, are described in §§ 5.2.3 and 5.2.4, respectively, below.

§ 5.2.3 Exemplary High Level Processes

Figure 4:
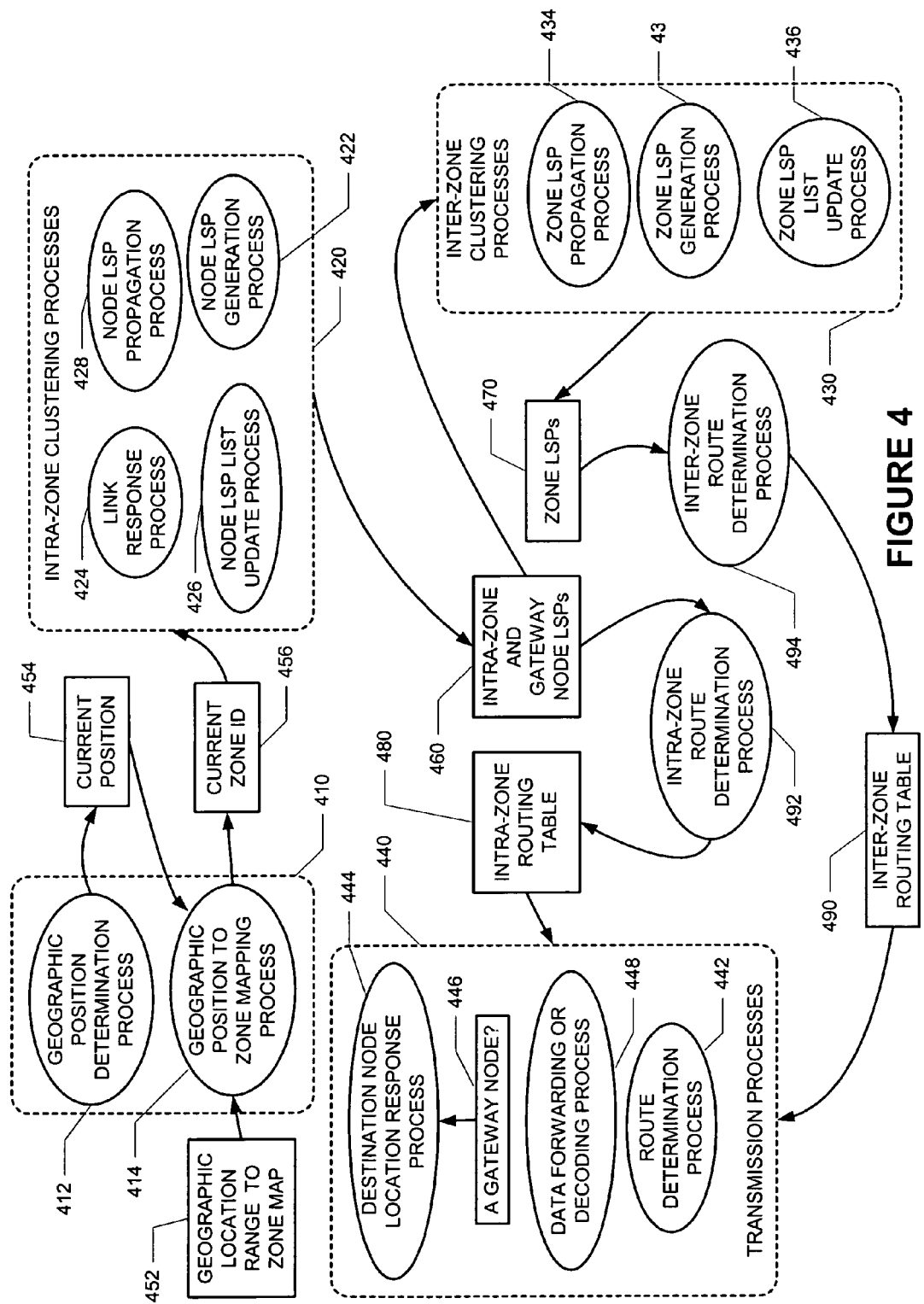
FIG. 4 is a diagram of various processes that may be performed by a node in accordance with the present invention, as well as various data or information that may be stored in a node in accordance with the present invention.

FIG. 4 is a high level diagram of processes that may be performed by nodes, such as the exemplary node 2021 of FIG. 3, in the network. Basically, the processes may be classified into one of three (3) categories: (i) self state determination; (ii) network state determination; and (iii) data transmission. The data transmission processes may be further classified into pre-transmission request processes and post-transmission request processes. Processes related to self state determination are introduced in § 5.2.3.1 below, processes related to network state determination are introduced in § 5.2.3.2 below, and processes related to data transmission are introduced in § 5.2.3.3 below.

§ 5.2.3.1 Processes Related to Node Self State Determination

Self state determination processes 410 may include a geographic position determination process 412 and a geographic position to zone mapping process 414. Referring to both FIGS. 3 and 4, the geographic position determination process 412 may be performed by the location determination unit 370, such as a global positioning system ("GPS") unit for example, to generate a current position 454. The geographic position to zone mapping process may then use the current position 454, as well as a geographic location range to zone map 452, to determine the zone 110, 456 of the network 100 in which the node 202 is currently located.

§ 5.2.3.2 Processes Related to Network State Determination

Network state determination processes may include intra-zone clustering processes 420 and inter-zone clustering processes 430. The intra-zone clustering processes 420 deal with the lower level of the two level hierarchy of the network 100, while the inter-zone clustering processes 430 deal with the higher level of the two level hierarchy of the network 100. The intra-zone clustering processes 420 may be used to generate a list 460 of intra-zone and gateway node (also referred to as "node level") link state packets (or "LSPs"), while the inter-zone clustering processes 440 may be used to generate a list 470 of inter-zone (also referred to as "zone level") link state packets (or "LSPs"). As will be described in more detail below, the node LSP of a particular node may contain a list of all "connected" neighbor nodes (i.e., nodes with which it has a physical communications link). Node LSPs may be propagated locally (i.e., within a zone). A zone LSP of a particular zone may include a list of all "connected" zones (i.e., zones with which a particular zone has a virtual link). Zone LSPs may be propagated globally (i.e., throughout the network).

Using the intra-zone clustering processes 420, each node 202 may broadcast, asynchronously, a link request. This broadcasting may be a part of the node LSP generation processes 422. Other nodes 202 within the communication range of the broadcasting node 202 may reply with link responses (e.g., of the format <node ID, zone ID>). This reply may be a part of the link response process 424. After all link responses are received, the node 202 may then generate its node LSP which may contain the node ID of its "connected" neighbors of the same zone and the zone ID of its "connected" neighbors of different zones. This step may be a part of the node LSP generation process 422 and the node LSP list update process 426. Each node 202 may then propagate its node LSP locally throughout its zone via intermediate nodes. This step may be a part of a node LSP propagation process 428. Since each node performs this procedure, a list of node LSPs (within a given zone) can be stored in every node. This step may be a part of the node LSP list update process 426. However, node LSPs from other zones should not be stored because nodes LSPs are only propagated within their zone. Thus, the intra-zone clustering processes 420 may include a node LSP generation process 422, a link response process 424, a node LSP list update process 426 and a node LSP propagation process 428.

Recall that during the node LSP generation process 422, nodes 212 may receive link responses from the "connected" nodes that may be outside of the current zone. Recall that these nodes may be called "gateway nodes". For example, as shown in FIG. 2, nodes "a", "c", "e" and "f" are gateway nodes of zone 1 (via nodes "g", "j", "h" and "i", respectively). Since node LSPs contain the zone IDs of the "connected" nodes, each node will know which zones are connected to its zone via a direct communications link. After confirming that all node LSPs are received, each node of the same zone generates the same zone LSP. This may be a part of the zone LSP generation process 432. The gateway nodes may then broadcast the zone LSPs throughout the network. This may be a part of the zone LSP propagation process 434. Since every zone performs this procedure, a list of zone LSPs may be stored by every node in the network. This storage may be a part of the zone LSP list update process 436. In this way, every node may know the zone level topology of the network.

§ 5.2.3.3 Processes Related to Data Transmission

As alluded to above, processes related to data transmission may be further classified as pre-transmission request processes and post-transmission request processes. Pre-transmission request processes are introduced in § 5.2.3.3.1 below, while post-transmission request processes are introduced in § 5.2.3.3.2 below.

§ 5.2.3.3.1 Pre-Transmission Request Processes

Pre-transmission request processes may include processes for generating intra-zone and inter-zone routing tables 480 and 490, respectively.

Regarding the intra-zone route determination process 492, after receiving all node LSPs of the same zone, each node 202 will know the node level topology of that zone. Each node may use the shortest path algorithm to build its intra-zone routing table 480. To account for node mobility and channel fading, this process 492 should be performed periodically to detect and update any change in the physical communications links. If a node 202 moves to another zone, its node LSP should be left in its old zone. Accordingly, a timer may be set for each received node LSP and any "expired" node LSP may be deleted.

Regarding the inter-zone route determination process 494, similar to the intra-zone clustering, each node can determine its inter-zone routing table 490 of the network from the zone LSPs 470. After each node 202 receives all zone LSPs, the shortest path algorithm may be used to find the shortest path in terms of zone hops and to build the inter-zone routing table 490. This process may be repeated periodically. However, in one embodiment, the gateway nodes will not broadcast a zone LSP if its value is the same as that of the old one. This takes advantage of the infrequent change in the virtual links and therefore reduces the amount of traffic. Moreover, unlike the node LSPs, no timer needs to be set for zone LSPs. In one embodiment, the zone LSP is updated only when any virtual link is broken or created.

In one embodiment of the invention duplicate copies of zone LSPs will not be forwarded. For example, assuming that a node receives two zone LSPs originated from different gateway nodes of the same zone, after forwarding the first zone LSP, the node need not forward the second zone LSP as it is identical to the first one. Therefore, even though there may be more than one gateway node in a zone, only one zone LSP need be generated from this zone. As the network spans a large area, zone LSP need not be received in the same order as they are sent. Accordingly, a time field may be added to the zone LSPs—that is, the zone LSPs may be source-sequenced. Since zone LSPs may be sent by more than one gateway node, the clocks of the nodes in the same zone should be synchronized. Local synchronization may be accomplished easily if the global positioning system (or "GPS") is used. If the received zone LSPs are out of order, obsolete zone LSPs may be deleted.

§ 5.2.3.3.2 Post-Transmission Request Processes

Post-transmission request processes may include processes for locating a destination node, for determining a route and for forwarding or decoding data.

In the current Internet protocol (IP), routing is designed to be hierarchical. (See, e.g., the article, R. Perlman, *Interconnections: Bridges and Routers*, Addison-Wesley, 1992, pp. 149–152 and pp. 205–233.). An IP network is typically partitioned into different subnetworks. Since the nodes in an IP network are typically stationary, each node is associated with a hierarchical IP address, which contains a fixed subnetwork ID. Like an IP network, with the present invention, the network is partitioned into subnetworks (e.g., zones). However, in the present invention, the nodes are not associated with fixed zone IDs due to the mobility of the nodes. Therefore, a source needs to search for the zone ID of a destination node before any data transmission can start. This search is performed by the route determination and destination node location response processes, 442 and 444, respectively.

Once the destination node is located, its zone ID and node ID may then be associated with the data to be transmitted (e.g., specified in a data header). If the destination node is not within the zone of a node transmitting or forwarding the data, that node will route the data to the zone specified by the zone ID in accordance with its inter-zone routing table 490. When the data reaches a node within the same zone as that of the destination node, that node will use its intra-zone routing table 480 to route the data to (or towards) the destination node.

Even if the node level or the zone level topology changes during the data transmission, routing can still be done properly. Moreover, data is forwarded properly even if a node has slightly outdated inter-zone information—since only the zone ID and node ID of a destination node are needed for routing; the route is adaptable to a changing network topology.

More than one cluster (i.e., a connected subnet within a zone) can exist within a zone even if the zone size is chosen according to typical transmission range of a node. For example, there may be a large obstacle such as a hill, a building, etc., in the zone that blocks radio communication. Assuming, for example, that there are two (2) clusters in a given zone, every node will receive two (2) zone LSPs from that zone. To distinguish these two (2) zone LSPs, one additional field, smallest node ID, may be added to the zone LSP. The zone LSPs will have different zone connectivity information from the zone. That is, the zone is sectioned into two zones. The rest of the processing will be the same except that the zone field will have one more sub-field.

§ 5.2.4 Exemplary Data Structures, Methods and Examples of Their Operations

In the following, an exemplary event management method is described in § 5.2.4.1, exemplary node state determination methods are described in § 5.2.4.2, exemplary intra-zone clustering methods and related data structures are described in § 5.2.4.3, exemplary inter-zone clustering methods and related data structures are described in § 5.2.4.4, exemplary intra-zone routing methods and related data structures are described in § 5.2.4.5, exemplary inter-zone routing methods and related data structures are described in § 5.2.4.6 and exemplary transmission methods and related data structures are described in § 5.2.4.7.

§ 5.2.4.1 Exemplary Event Management Method

FIG. 5, which includes FIGS. 5A and 5B, is a flow diagram of an exemplary event management method 500 which may be used in nodes in the present invention. No ordering should be inferred from the flow diagram of FIG. 5 unless an act depends upon the result of another act.

As shown at decision block 502, it is determined whether or not a link request has been received. If so, a link response process (Recall, e.g., process 424.) may be invoked as shown in block 504 and the method 500 continues to decision block 506. Otherwise, the method 500 continues directly to decision block 506.

As shown at decision block 506, it is determined whether or not a node LSP has been received. If so, a node LSP propagation process (Recall, e.g., process 428.) may be invoked as shown in block 508 and the method 500 continues to decision block 510. Otherwise, the method 500 continues directly to decision block 510.

As shown at decision block 510, it is determined whether or not a link response has been received. If so, a node LSP list update process (Recall, e.g., process 426.) may be invoked as shown in block 512 and the method 500 continues to decision block 514. Otherwise, the method 500 continues directly to decision block 514.

As shown at decision block 514, it is determined whether or not a data transmission has been requested. If so, a route determination process (See, e.g., process 442.) may be invoked as shown in block 516 and the method 500 continues to decision block 518. Otherwise, the method 500 continues directly to decision block 518.

As shown at decision block 518, it is determined whether or not data has been received from another node. If so, a data forwarding or decoding process (See, e.g., process 448.) may be invoked as shown in block 520 and the method 500 continues to decision block 522. Otherwise, the method 500 continues directly to decision block 522.

As shown at decision block 522, it is determined whether or not a location of a destination node has been requested.

If so, and if it is determined that the node is a gateway node, a destination node location determination process (See, e.g., process 444.) may be invoked as shown in decision block 524 and block 526, and the method 500 continues, via connector "A" 528, to decision block 530. Otherwise, the method 500 continues directly, via connector "A" 528, to decision block 530.

As shown at decision block 530, it is determined whether or not it is time to determine a node's position and the zone of the network in which it resides. If so, a geographic position and zone ID determination process (See, e.g., processes 412 and 414.) may be invoked as shown in block 532 and the method 500 continues to decision block 534. Otherwise, the method 500 continues directly to decision block 534.

As shown at decision block 534, it is determined whether or not it is time to perform intra-zone clustering. If so, a node LSP generation process (See, e.g., process 422.) may be invoked as shown in block 536 and the method 500 continues to decision block 538. Otherwise, the method 500 continues directly to decision block 538.

As shown at decision block 538, it is determined whether or not it is time to build (or rebuild) an intra-zone routing table. If so, an intra-zone routing table building (or rebuilding) process (See, e.g., process 492.) may be invoked as shown in block 540 and the method 500 continues to decision block 542. Otherwise, the method 500 continues directly to decision block 542.

As shown at decision block 542, it is determined whether or not it is time to build (or rebuild) an inter-zone routing table. If so, an inter-zone routing table building (or rebuilding) process (See, e.g., process 494.) may be invoked as shown in block 544 and the method 500 continues to decision block 546. Otherwise, the method 500 continues directly to decision block 546.

As shown at decision block 546, it is determined whether or not it is time to perform inter-zone clustering. If so, a zone LSP generation process (See, e.g., process 432.) may be invoked as shown in block 548 and the method 500 continues to decision block 550. Otherwise, the method 500 continues directly to decision block 550.

As shown at decision block 550, it is determined whether or not it is time to update a zone LSP list. If so, a zone LSP list update process (See, e.g., process 436.) may be invoked as shown in block 552 and the method 500 continues to decision block 554. Otherwise, the method 500 continues directly to decision block 554.

As shown at decision block 554, it is determined whether or not a zone LSP has been received. If so, a zone LSP propagation process (See, e.g., process 434.) may be invoked as shown in block 556 and the method 500 continues to RETURN node 558. Otherwise, the method 500 continues directly to RETURN node 558. Although not shown, the event management process 500 should be repeatedly (e.g., continuously) run by each node.

§ 5.2.4.2 Exemplary Node State Determination Methods

FIG. 6 is a high level flow diagram of an exemplary method 600 which may be used to effect node state determination processes (Recall, e.g., processes 412 and 414 of FIG. 4.). First, as shown in block 610, a current geographic position of the node is accepted. The node may determine its own geographic position for example, using a global positioning system (or "GPS"). The node may accept its current geographic position from other means for determining a geographic position. Such means may be a part of the node or, alternatively, may be external to the node. Then, as shown in block 620, the current geographic position of the node is converted to a zone of the network based on a mapping function or table. The method 600 is then left via RETURN node 630.

§ 5.2.4.3 Exemplary Intra-Zone Clustering Methods and Related Data Structures

Exemplary methods which may be used to effect various intra-zone clustering processes (Recall, e.g., processes 422, 424, 426 and 428 of FIG. 4.) are described below with reference to FIGS. 7 through 9.

FIG. 7 is a high level flow diagram of an exemplary method 422'/428' which may be used to effect the node LSP generation and propagation processes 422 and 428, respectively. As shown by block 710, a link request is broadcast. As shown by decision block 720, it is determined whether or not a link response has been received. (Actually, this decision block 720 is redundant to decision block 510 and is, therefore, not strictly necessary.) If not, the method 422'/428' may continue to decision step 760, described later.

Referring back to decision block 720, if it is determined that a link response has been received, the method branches to decision block 730 where it is determined whether or not the link response was from a node within the same zone. If the link response was from a node within the same zone, then the node LSP may be updated with the node ID of the neighbor node in the same zone, as shown in block 740, and the method 422'/428' continues to decision step 760, described later. If, on the other hand, the link response was not from a node within the same zone, then the node LSP may be updated with the zone ID of the neighbor node of the different zone, as shown in block 750, and the method 422'/428' continues to decision step 760.

Decision step 760 determines whether or not a response time-out, which may be determined from the time that the link request was broadcast, has expired. If not, the method 422'/428' may branch back to decision block 710. If, on the other hand, the response time-out has expired, then the node LSP may be broadcast as shown in block 770. This broadcasting may serve to propagate the node LSPs to other nodes in the zone. The method 422'/428' may then be left via RETURN node 780.

Recall from blocks 710 and 720 of FIG. 7 that a node may broadcast a link request and wait for responses. FIG. 8 is a high level flow diagram of an exemplary method 424' which may be used to effect the link response process 424. First, as shown by block 810, the node accepts the link request. In reply, the node may then respond to the link request as shown in block 820. The method 424' may then be left via RETURN node 830.

Recall from block 770 of FIG. 7 that a node may broadcast its node LSP. Recall further that this broadcasting may serve to propagate the node LSPs to other nodes in the zone. FIG. 9 is a high level flow diagram of an exemplary method 426' which may be used to effect a node LSP list update process 426. As shown by decision block 910, it is determined whether or not a node LSP (from another node) has been received. (Actually, this decision block 910 is redundant to decision block 506 and is, therefore, not strictly necessary.) If a node LSP has not been received, the method 426' continues to decision step 940, described later. If, on the other hand, a node LSP has been received, as shown by decision block 920, it is determined whether or not the other node, from which the node LSP was received, is within the same zone as the node receiving it. If the other node, from which the node LSP was received, is not within the same zone as the node receiving it, then the method 426' continues to decision step 940, described later. If, on the other hand, the other node, from which the node LSP was received, is within the same zone as the node receiving it, then the received node LSP is stored (in the node LSP list) as shown in block 930, and the method 426' may continue to decision step 940.

At decision step 940, it is determined whether or not a response time-out (which may be determined from the time the node transmitted its own link request or from the time the node transmitted its own node LSP, for example) has expired. If not, the method 426' may branch back to decision block 910. If, on the other hand, the response time-out has expired, then the method 426' may be left via RETURN node 950.

In view of the foregoing, each node may build a list of intra-zone node LSPs and gateway node LSPs. (Recall, e.g., 460 of FIG. 4.) FIG. 10 is an exemplary node LSP list 460'. This exemplary list 460' may include a field 1020 for storing a value for identifying the zone, as well as records 1030. Each record 1030 may include a field 1032 for storing a value for identifying a node and a field 1034 for storing a value for identifying nodes and zones connected with (e.g., capable of communication, without the need for intervening nodes, or having a physical communication link with) the node identified in the field 1032.

FIG. 11 is an example of an LSP list 460" for the zone "1", as indicated by field 1020', depicted in FIG. 2. As the first record 1030' indicates, node "a" is connected with nodes "b", "c" and "d" in zone "1" and is connected with zone "4" (via node "g"). As the second record 1030' indicates, node "b" is connected with nodes "a" and "e" in zone "1". As the third record 1030' indicates, node "c" is connected with node "a" in zone "1" and is connected with zone "3" (via node "j"). As the fourth record 1030' indicates, node "d" is connected with node "a" in zone "1". As the fifth record 1030' indicates, node "e" is connected with nodes "b" and "f" in zone "1" and is connected with zone "2" (via node "h"). Finally, as the sixth record 1030' indicates, node "f" is connected with node "e" in zone "1" and is connected with zone "2" (via node "i")

§ 5.2.4.4 Exemplary Inter-Zone Clustering Methods and Related Data Structures

Exemplary methods which may be used to effect various inter-zone clustering processes (Recall, e.g., processes 432, 434, and 436 of FIG. 4.) are described below with reference to FIGS. 12 and 13.

FIG. 12 is a high level flow diagram of an exemplary method 432'/434' which may be used to effect the zone LSP generation and propagation processes 432 and 434, respectively. As shown by block 1210, each node may generate a zone LSP based on its list of node LSPs 460. At decision block 1220 it is determined whether or not the node is a "gateway" node. If so, it may broadcast its zone LSP as shown in block 1230 and the method 432'/434' may then continue to RETURN node 1240. If, on the other hand, the node is not a "gateway" node, then the method 432'/434' may be left via RETURN node 1240.

FIG. 13 is a high level flow diagram of an exemplary method 436' which may be used to effect the zone LSP update process 436. At decision block 1310, it is determined whether or not a new zone LSP is received. (Actually, this decision block 1310 is redundant to decision block 554 and is, therefore, not strictly necessary). If so, the node's zone LSP table 470 is updated, as shown in block 1320, the new zone LSP is broadcast (to propagate it), as shown in step 1330, and the method 436' is left via RETURN node 1340. If, on the other hand, if a new zone LSP is not received, then the method 436' is simply left via RETURN node 1340.

In view of the foregoing, each node may build a list of zone LSPs. (Recall, e.g., 470 of FIG. 4.) FIG. 14 is an exemplary zone LSP list 470'. This exemplary zone LSP list 470' may include records 1410, each record 1410 including a field 1412 for storing a value identifying a zone and a field 1414 for storing a value identifying zone(s) connected with the zone identified in field 1412.

FIG. 15 is an exemplary zone LSP table 470" for the network illustrated in FIG. 1. As the first record 1410" indicates, zone "1" is connected with zones "2", "3" and "4". Referring more specifically to FIG. 2, notice that zone "1" is connected with (i.e., has a virtual connection with) zone "2" via nodes "e" and "h", as well as via nodes "f" and "i", zone "1" is connected with zone "3" via nodes "c" and "j", and zone "1" is connected with zone "4" via nodes "a" and "g". Referring back to FIGS. 1 and 15, as the second record 1410" indicates, zone "2" is connected with zones "1" and "6". As the third record 1410" indicates, zone "3" is connected with zones "1", "7" and "8". As the fourth record 1410" indicates, zone "4" is connected with zones "1" and "9". As the fifth record 1410" indicates, zone "5" is connected with zones "6" and "9". As the sixth record 1410" indicates, zone "6" is connected with zones "2" and "5". As the seventh record 1410" indicates, zone "7" is connected with zone "31". As the eighth record 1410" indicates, zone "8" is connected with zone "3". Finally, as the ninth record 1410" indicates, zone "9" is connected with zones "4" and "5".

§ 5.2.4.5 Exemplary Intra-Zone Routing Methods and Related Data Structures

After receiving all node LSPs of the same zone, each node will know the node level topology of the zone to which it belongs. Known algorithms, such as the shortest path algorithm for example, may be used to generate an intra-zone routing table from the node LSPs.

Since the nodes are mobile and communications channels may fade, the intra-zone clustering (described in § 5.2.4.3 above) and routing processes should be performed periodically to detect any change in the physical communications links and make any appropriate updates to the LSP lists and routing table. If a node moves to another zone, its node LSP may be left in its old zone. To account for this, a timer may be set for each received node LSP and those node LSPs with expired timers may be deleted.

FIG. 16 is an exemplary data structure 480' for an intra-zone routing table 480. The exemplary table 480' may include a field 1610 for storing a value for identifying the node (and, optionally, the zone). A number of records 1620 may each include a field 1622 for storing a value 1622 for identifying a destination node (or zone via a connected gateway node) and a field 1624 for storing a value 1624 for storing a next node.

FIG. 17 is an example of an intra-zone routing table 480" for the node "a" (of zone "1"), as indicated by field 1610', depicted in FIG. 2. As the first record 1620' indicates, if the destination is node "b", the next node (e.g., next hop) is node "b". (Notice from FIG. 2 that node "a" has a physical communications link with ("is connected with") node "b".) As the second record 1620' indicates, if the destination is node "c", the next node is node "c". (Notice from FIG. 2 that node "a" is connected with node "c".) As the third record 1620' indicates, if the destination is node "d", the next node is node "d". (Notice from FIG. 2 that node "a" is connected with node "d".) As the fourth record 1620' indicates, if destination is node "e", the next node is node "b". (Notice from FIG. 2 that node "a" can communicate with node "e" via node "b".) As the fifth record 1620' indicates, if the destination is node "f", the next node is node "b". (Notice from FIG. 2 that node "a" can communicate with node "f" via nodes "b" and "e".) As the sixth record 1620' indicates, if the destination is zone "2", the next node is node "b". (Notice from FIG. 2 that node "a" can communicate with zone "2" via nodes "b", "e" and "h".) As the seventh record 1620' indicates, if the destination is zone "3", the next node is node "c". (Notice from FIG. 2 that node "a" can communicate with zone "3" via nodes "c" and "j".) As the eighth record 1620' indicates, if the destination is zone "4", the next node is node "g". (Notice from FIG. 2 that node "a" can communicate with zone "4" directly via node "g".)

§ 5.2.4.6 Exemplary Inter-Zone Routing Methods and Related Data Structures

After receiving all zone LSPs of the network, each node will know the zone level topology of the network. Known algorithms, such as the shortest path (e.g., in terms of zone hops) algorithm for example, may be used to generate an inter-zone routing table from the zone LSPs.

The inter-zone clustering (described in § 5.2.4.4 above) and routing processes should be performed periodically. Note that gateway nodes will not need to broadcast a zone LSP if its value is the same as the previous zone LSP. Not re-broadcasting an unchanged zone LSP reduces unneeded traffic, especially since the virtual links between zones typically will change infrequently. Unlike node LSPs, no timer is set for zone LSPs—in one embodiment of the present invention, a zone LSP is updated only when any virtual link (between zones) is broken or created. To reiterate what is meant by a "virtual link" in this context, referring to FIG. 2, notice that zone 2 and zone 1 are connected via two physical links—that between nodes "e" and "h" and that between nodes "f" and "i". If a further physical link is added between zones 1 and 2, that would not "create" a virtual link since one already exists. Similarly, if only one of the two physical links between zones 1 and 2 were broken, that would not "break" the virtual link between those zones since the other physical links would still exist. A virtual link would be created between zones "1" and "5" if a node was added to zone "5" that had a physical communications links with any one of the nodes (e.g., node "d" or "b") in zone "1". Similarly, a virtual link would be broken between zones "1" and "4" if the physical link between nodes "a" and "9" were broken.

FIG. 18 is an exemplary data structure 490' for an inter-zone routing table 490. The exemplary table 490' may include a field 1810 for storing a value for identifying the node. A number of records 1820 may each include a field 1822 for storing a value for identifying a destination zone, a field 1824 for storing a value for identifying a next zone, and a field 1826 for storing a value for identifying a next node.

FIG. 19 is an example of an inter-zone routing table 490" for the node "a" (of zone "1"), as indicated by field 1810'. Referring to FIGS. 1, 2 and 19, as the first record 1820' indicates, if the destination node is in zone "2", the next zone is zone "2" and the next node is node "b". (Notice from FIG. 1 that zones "1" and "2" have a virtual connection and notice from FIG. 2 that node "a" can communicate with zone "2" via nodes "b", "e" and "h".) As the second record 1820' indicates, if the destination node is in zone "3", the next zone is zone "3" and the next node is node "c". (Notice from FIG. 1 that zones "1" and "3" have a virtual connection and notice from FIG. 2 that node "a" can communicate with zone "31" via nodes "c" and "j".) As the third record 1820' indicates, if the destination node is in zone "4", the next zone is zone "4" and the next node is node "g". (Notice from FIG. 1 that zones "1" and "4" have a virtual connection and notice from FIG. 2 that node "a" can communicate with zone "4" via node "g".) As the fourth record 1820' indicates, if the destination node is in zone "5", the next zone is zone "4" and the next node is node "g". (Notice from FIG. 1 that zones "1" and "5" do not have a virtual connection, but can communicate via zones "4" and "9".) As the fifth record 1820' indicates, if the destination node is in zone "6", the next zone is zone "2" and the next node is node "b". (Notice from FIG. 1 that zones "1" and "6" do not have a virtual connection, but can communicate with via zone "2".) As the sixth record 1820' indicates, if the destination node is in zone "7", the next zone is zone "131" and the next node is node "c". (Notice from FIG. 1 that zones "1" and "7" do not have a virtual connection, but can communicate with via zone "3".) As the seventh record 1820' indicates, if the destination node is in zone "8", the next zone is zone "3" and the next node is node "c". (Notice from FIG. 1 that zones "1" and "8" do not have a virtual connection, but can communicate with via zone "3".) Finally, as the eighth record 1820' indicates, if the destination node is in zone "9", the next zone is zone "4" and the next node is node "g". (Notice from FIG. 1 that zones "1" and "9" do not have a virtual connection, but can communicate with via zone "4".)

§ 5.2.4.7 Exemplary Transmission Methods and Related Data Structures

Exemplary methods which may be used to effect various transmission processes (Recall, e.g., processes 442, 444 and 448 of FIG. 4.) are described below with reference to FIGS. 20, 21 and 22, respectively.

FIG. 20 is a high level flow diagram of an exemplary method 442' which may be used to effect the route determination process 442. Initially, at decision block 2010, it is determined whether or not a destination node is within the source node's zone (e.g., in the source node's intra-zone routing table 480). If so, the data may be routed to the destination node according to the source node's intra-zone routing table 480 as shown in block 2070, and the method 442' may be left via RETURN node 2080.

Referring back to decision block 2010, if it is determined that the destination node is not within the source node's zone, then the method 442 may proceed to block 2020 which indicates that a location request is transmitted to every other zone. The transmission request may have the format:

(source node, source node zone, destination node, targeted zone).

As shown by decision block 2030 and decision block 2040, the node may wait for a response to its location request. Referring specifically to decision block 2040, a time out period may be set so that if a response is not received within the time out period, the method 442' may be left via RETURN node 2080. Referring back to decision node 2030, if a location response is received, a destination zone ID and a destination node ID are provided to control information (e.g., a header) associated with the data to be transmitted as shown in block 2050. Then, as shown in block 2060, the node may route the data based on its inter-zone routing table 490 and the method 442' may be left via RETURN node 2080.

FIG. 21 is a high level flow diagram of an exemplary method 444' which may be used to effect the destination node location response process 444. Recall from block 2020 of FIG. 20 that a location request may be transmitted by a node. The exemplary method 444' of FIG. 21 concerns responding to such a request. As shown in block 2110, the current node's intra-zone routing table is checked to determine whether the destination node exists in the zone of the current node. As shown by decision block 2120, if the destination node is not in the zone of the current node, the method 444' is left via RETURN node 2140. If, on the other hand, the destination node is in the zone of the current node, then the node replies with a location response as shown in block 2130. The location response may have the following format:

(destination node, zone of destination node, source node, zone of source node)

The method 444' may then be left via RETURN node 2140.

FIG. 22 is a high level flow diagram of an exemplary method 448' which may be used to effect the data forwarding or decoding process 448. Recall from block 2060 or 2070 of FIG. 20 that data may be routed based on inter-zone or intra-zone routing tables 490 or 480, respectively. As indicated by decision block 2210, if a data packet is received, the main portion of the method 448' is entered. (Actually, this decision block 2210 is redundant to the decision block 518 of FIG. 5A and is, therefore, not strictly necessary.) At decision block 2220, it is determined whether or not the destination zone ID is the same as the zone ID of the current node. If not, as shown in block 2260, the data (which may be packet) is advanced to (or towards) the destination zone based on the current node's inter-zone routing table 490, and the method 448' is left via RETURN node 2270. If, on the other hand, it is determined that the destination zone ID is the same as the zone ID of the current node, then the method 448' branches to decision block 2230. At decision block 2230, it is determined whether or not the destination node ID is the same as the node ID of the current node (that is, whether the current node is the destination node of the data). If so, the data may be decoded (if necessary) and read as indicated by block 2250, and the method 448' may then be left via RETURN node 2270. Referring back to decision block 2240, if it is determined that the destination node ID is not the same as the node ID of the current node, then the data (which may be a packet) may be advanced to (towards) the destination node based on the current node's intra-zone routing table 480 as indicated by block 2240, before the method 448' is left via RETURN node 2270.

§ 5.3 Examples of Operations

Figure 23A:
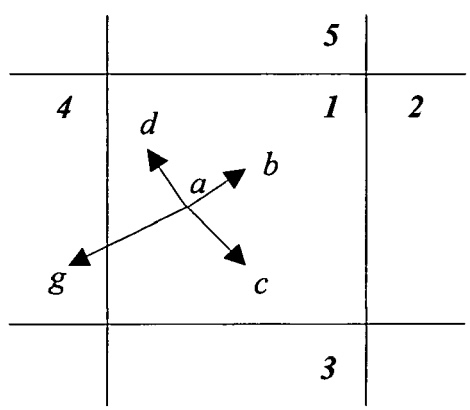
Figure 23B:
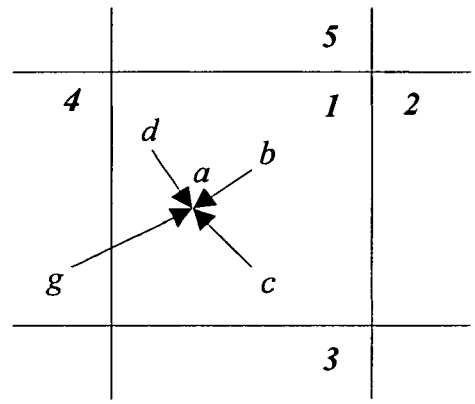
Figure 23C:
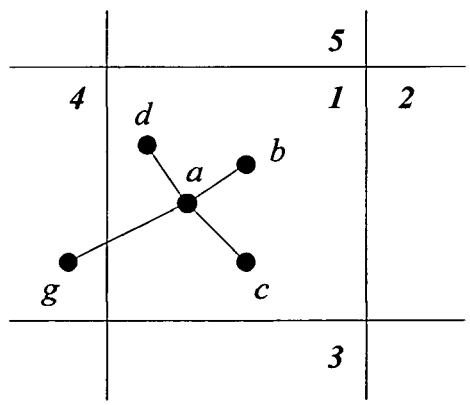
Figure 23D:
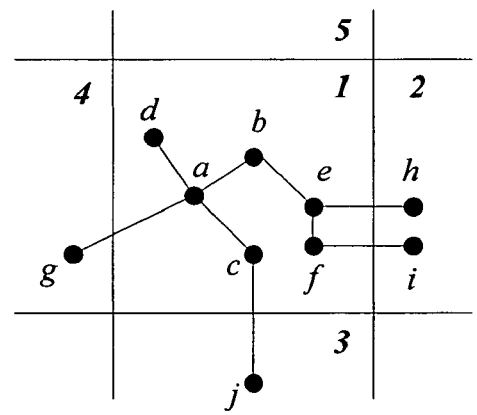

FIGS. 23A through 23D illustrate an intra-zone clustering procedure. As shown in FIG. 23A, node "a" broadcasts a link request to its neighbors. Then, as shown in FIG. 23B, node "a" receives link responses from its neighbors. Next, as shown in FIG. 23C, node "a" generates its own node LSP and broadcasts it throughout the zone. All nodes perform the previous steps asynchronously, thereby generating a list of node LSPs which depict the state of the zone as shown in FIG. 23D.

Recall that a source searches for the zone ID of a destination node before any data transmission starts. For example, referring to FIGS. 24A and 24B, if node "a" wants to send data to node "z", before sending data to node "z", node "a" will determine whether node "z" exists in its intra-zone routing table. If so, node "a" will route the data to node "z" according to its intra-zone routing table. Otherwise, node "z" is in a different zone and node "a" will send a location request <a, 1 (a's zone ID), z, X> to every other zone "X". Each intermediate node routes the location request destined for zone "X" to zone "X" according to its inter-zone routing table. The path from node "a" to zone "X" is adaptable to changing topology. A gateway node of each zone will receive the location request and check its intra-zone routing table to see if node "z" exists in its zone. There is no limit of one gateway node per zone. This avoids single point of failure. A gateway node in the same zone of node "z" will reply with a location response <z, 5 (z's zone ID), a, 1>. This search incurs much smaller amount of overhead than a corresponding search—flooding—in the Dynamic Source Routing protocol (DSR) and the Ad Hoc On Demand Distance Vector Routing protocol (AODV). The Zone ID (5) and the node ID (z) are then specified in the data header. Node "a" will route the data via node "g" to zone "5" according to its inter-zone routing table. All intermediate nodes, except those in zone "5", route the data to zone "5" according to their own inter-zone routing tables. When the data reaches zone "5", the intermediate nodes will instead use their intra-zone routing tables to route the data to node "z".

Even if the node level or the zone level topology changes during the data transmission, routing can still be done properly. For example, the zone level topologies at time t1 and time t2 are shown in FIGS. 25A and 25B, respectively. Nodes in zone "X" can still route the data to node "d" even though one of the virtual paths between zone "X" and zone "D" (zone ID of node "d") is broken at the time of transmission. Moreover, the packet is sent properly even if node "s" has slightly outdated inter-zone information because only zone ID and node ID of a destination are needed for routing. As this example illustrates, the route is adaptable to dynamic topology. On the contrary, in the Dynamic Source Routing protocol, subsequent search has to be performed to find a route again whenever the current route is broken due to node mobility.

More than one cluster can exist within a zone, even if the zone size is chosen according to typical transmission range of a node. For example, there may be a large obstacle such as a hill, a building, etc., in the zone that blocks radio communication. As shown in FIG. 26, there are two (2) clusters in the same zone. Every node will receive two (2) zone LSPs from zone "1". To identify them, one additional field, "smallest node ID", is added to the zone LSP. In FIG. 26, every node receives two (2) zone LSPs—LSP 1.a and LSP 1.c—with different zone connectivity information from zone "1". That is, zone "1" is split into zone "1a" and zone "1c". The rest of the processing will be the same except that the zone field will have one more sub-field.

The communication overhead for creating the topology is now discussed. Consider a network with N nodes. The network is partitioned into M zones. Assuming that the nodes are distributed evenly throughout the network, each zone will have (N/M) nodes. The amount of communication overhead of node LSPs $S_{node}$ becomes $(N/M)^2$ per zone or $M(N/M)^2 = N^2/M$ in the network. As each zone generates one zone LSP and every node has to forward all zone LSPs once, the amount of communication overhead of zone LSPs $S_{zone}$ becomes NM. So, the total amount of communication overhead generated $S_{ZHLS}$ is $$S_{ZHLS} = N^{21}M + NM \text{ messages}$$

The number of zones will affect the communication overhead generated. When the number of zones M increases, $S_{node}$ will decrease and $S_{zone}$ will increase. The minimum $S_{ZHLS}$ is achieved when $$\frac{dS_{ZHLS}}{dM} = 0$$

$$\left(\text{it is a minimum value as } \frac{d^2 S_{ZHLS}}{dM^2} = \frac{2N^2}{M^3} > 0\right).$$

Therefore, the optimal number of zones to achieve the minimum $S_{ZHLS}$ is $$0 = \frac{dS_{ZHLS}}{dM} = N - \frac{N^2}{M_{opt}^2} \therefore M_{opt} = \sqrt{N}$$

and the minimum $S_{ZHLS}$ is $$S_{ZHLS\ MIN} = 2N^{3/2} \text{ messages}$$

Communications overhead induced by node mobility is now discussed. Locally propagated node LSPs are generated if the physical link between any two nodes creates or breaks due to node movement. On the other hand, globally propagated zone LSPs are generated only when the number of physical links connecting any two zones increases from zero or decreases to zero. The zone size of a network may be chosen such that the average number of physical links connecting two zones is much higher than zero, i.e., the chance of having no physical links connecting two zones is small. Therefore, the present inventors expect that the transitions between the state of having no physical link and that of having physical links to be infrequent, and expect that the zone level topology is relatively robust to node movement compared to the node level topology. The percentage of nodes generating node LSPs in one cycle due to changes in physical links may be denoted as $p_{node}$ and that of zones generating zone LSPs in one cycle may be denoted as $p_{zone}$. Therefore, the total amount of communication overhead induced by mobility $K_{ZHLS}$ is $$K_{ZHLS} = N^2 p_{node}/M + NM p_{zone} \text{ messages/cycle}$$

Since the zone level topology is more robust than the node level topology, $P_{zone} < P_{node} = P_{LSR}$. Thus, $$K_{ZHLS} < N^2 P_{LSR}/M + NM p_{LSR} < N^2 P_{LSR} = K_{LSR}$$

The hierarchical routing reduces the overhead induced by mobility.

§ 5.4 CONCLUSIONS

In view of the foregoing, the present invention generates less location search overhead than the schemes based on flooding. Further, the communication overhead for creating and maintaining the topology in the present invention is smaller than that in the flat Link State Routing protocol. The routing protocol of the present invention provides a flexible, efficient and effective approach to accommodate the changing topology in a wireless network environment.

Unlike other hierarchical protocols, there are no cluster heads in this protocol. The high level topological information is distributed to all nodes (i.e. in a "peer-to-peer" manner). This "peer-to-peer" characteristic of the present invention avoids traffic bottlenecks, prevents single point of failure and simplifies mobility management. The present invention is a hybrid reactive/proactive scheme—it is proactive if the destination is within the same zone of the source, but otherwise, is reactive because a location search is needed to find the zone ID of the destination. However, unlike other prior art schemes, the present invention maintains a high level hierarchy for inter-zone routing. Location search may be performed by unicasting one location request to each zone. Routing may be done by specifying the zone ID and the node ID of the destination, instead of specifying an ordered list of all the intermediate nodes between the source and the destination. Intermediate link breakage typically does not cause any subsequent location search. Since the network may include non-overlapping zones, frequency reuse is readily deployable.

What is claimed is:

1. In a network having a plurality of nodes arranged in at least two zones, a method for a particular node to determine a current partial topological state of the network, the method comprising:
   a) determining a zone of the network in which the particular node resides;
   b) for each node in the zone, determining nodes having a physical communication link with the node in the zone; and
   c) for each zone in the network, determining zones having a virtual connection with the zone in the network,
   wherein the act of determining nodes having a physical communication link with the node in the zone includes:
   i) broadcasting a link request from the node;
   ii) if a response to the link request is received by the node,
      A) if the response was from a node within the same zone as the node, storing an identifier of the responding node, and
      B) if the response was from a node that is not within the same zone as the node, storing an identifier of the zone to which the responding node belongs; and
   iii) broadcasting, from the particular node, a link state message including the identifier of the responding node if the response was from a node within the same zone and the identifier of the zone to which the responding node belongs if the response was from a node not within the same zone as the node.

2. The method of claim 1, wherein the act of determining nodes having a physical communication link with the node in the zone further includes:
   iv) if a link state message is received, by the node, from another node, then storing the link state message if the other node is within the same zone as the particular node.

3. In a network having a plurality of nodes arranged in at least two zones, a method for a particular node to determine a current partial topological state of the network, the method comprising:
   a) determining a zone of the network in which the particular node resides;
   b) for each node in the zone, determining nodes having a physical communication link with the node in the zone; and
   c) for each zone in the network, determining zones having a virtual connection with the zone in the network,
   wherein the act, for each zone in the network, of determining zones having a virtual connection with the zone in the network includes:
   i) determining whether another zone has a node with a physical communications link with a node in the zone, and
   ii) if it is determined that the other zone has a node with a physical communications link with the zone in the zone, then storing a data structure including an identification of the other zone.

4. The method of claim 3, wherein the act, for each zone in the network, of determining zones having a virtual connection with the zone in the network further includes:
   iii) sending the stored data structure, including the identification of the other zone, throughout the network.

5. The method of claim 4 wherein the stored data structure, including the identification of the other zone, is only broadcast by gateway nodes.

6. In a network having a plurality of nodes arranged in at least two zones, a method for a particular node to determine a current partial topological state of the network, the method comprising:
   a) for each node in a zone in which the particular node resides, determining nodes having a physical communication link with the node in the zone; and
   b) for each zone in the network, determining zones having a virtual connection with the zone in the network,
wherein the act of determining nodes having a physical communication link with the node in the zone includes:
   i) broadcasting a link request from the node;
   ii) if a response to the link request is received by the node,
      A) if the response was from a node within the same zone as the node, storing an identifier of the responding node, and
      B) if the response was from a node that is not within the same zone as the node, storing an identifier of the zone to which the responding node belongs; and
   iii) broadcasting, from the particular node, a link state message including the identifier of the responding node if the response was from a node within the same zone as the node and the identifier of the zone to which the responding node belongs if the response was from a node that is not within the same zone as the node.

7. In a network having a plurality of nodes arranged in at least two zones, a method for a particular node to determine a current partial topological state of the network, the method comprising:
   a) for each node in a zone in which the particular node resides, determining nodes having a physical communication link with the node in the zone; and
   b) for each zone in the network, determining zones having a virtual connection with the zone in the network,
wherein the act, for each zone in the network, of determining zones having a virtual connection with the zone in the network includes:
   i) determining whether another zone has a node with a physical communications link with a node in the zone, and
   ii) if it is determined that the other zone has a node with a physical communications link with the zone in the zone, then storing a data structure including an identification of the other zone.

8. In a network having a plurality of nodes arranged in at least two zones, a method for transmitting data from a first node in the network to a second node in the network, the method comprising:
   a) determining whether or not the second node is in the same zone as the first node;
   b1) if it is determined that the second node is in the same zone as the first node, then routing the data towards the second node based on an intra-zone routing table; and
   b2) if it is determined that the second node is not in the same zone as the first node, then
      i) transmitting a location request,
      ii) if a response to the location request is received, then ensuring that the data is provided with a zone identifier and node identifier for the second node, and
      iii) routing the data based on an inter-zone routing table.

9. In a network having a plurality of nodes arranged in at least two zones, a method for a particular node to respond to a request for the location of a destination node, the method comprising:
   a) determining whether or not the destination node is in the zone of the particular node; and
   b) if the zone of the destination node is in the zone of the particular node, transmitting a reply message which includes an identifier of the zone of the particular node,
   wherein the step of determining whether or not the destination node is in the zone of a particular node is done based on the contents of a intra-zone routing table of the particular node.

10. In a network having a plurality of nodes arranged in at least two zones, a method for a particular node to forward data towards a destination node in a destination zone, the method comprising:
   a) determining whether or not the destination zone of the data is the same as the zone of the particular node;
   b1) if it is determined that the destination zone of the data is not the same as the zone of the particular node, then advancing the data towards the destination zone based on an inter-zone routing table; and
   b2) if it is determined that the destination zone of the data is the same as the zone of the particular node, but that the particular node is not the destination node, then advancing the data towards the destination node based on an intra-zone routing table.

11. The method of claim 10 further comprising:
   b3) if it is determined that the destination zone of the data is the same as the zone of the particular node, and that the particular node is the destination node, then reading the data.

12. A network having a plurality of nodes arranged in at least two zones, each node comprising:
   a) a storage device, the storage device storing
      i) a value identifying one of the at least two zones in which the current node resides,
      ii) a list of nodes with which the current node has a physical communications link, and
      iii) a list of zones with which the one of the at least two zones has a virtual connection; and
   b) a processor which can access information stored on the storage device.

13. The network of claim 12, wherein the storage device further stores
   iv) an intra-zone routing table, and
   v) an inter-zone routing table.

14. The network of claim 12, wherein the storage device further stores
   iv) a list of zones which include a node with which the current node has a physical communications link.

15. In a network having a plurality of nodes arranged in at least two zones, a node comprising:
   a) a storage device, the storage device storing
      i) a value identifying one of the at least two zones in which the current node resides,
      ii) a list of nodes with which the current node has a physical communications link, and
      iii) a list of zones with which the one of the at least two zones has a virtual connection; and
   b) a processor which can access information stored on the storage device.

16. The node of claim 15, wherein the storage device further stores
  iv) an intra-zone routing table, and
  v) an inter-zone routing table.

17. The node of claim 15, wherein the storage device further stores
  iv) a list of zones which include a node with which the current node has a physical communications link.

18. In a network having a plurality of nodes arranged in at least two zones, a method for a particular node to generate intra-zone and inter-zone routing tables based on a partial topological current state of the network, the method comprising:
  a) determining a zone of the network in which the particular node resides;
  b) for each node in the zone, determining nodes having a physical communication link with the node in the zone;
  c) determining an intra-zone routing table from the nodes determined to have a physical communication link with the node in the zone;
  d) for each zone in the network, determining zones having a virtual connection with the zone in the network; and
  e) determining an inter-zone routing table from the zones determined to have a virtual connection with the zone in the network.

19. In a network having a plurality of nodes arranged in at least two zones, a method for a particular node to generate intra-zone and inter-zone routing tables based on a partial topological current state of the network, the method comprising:
  a) for each node in the zone, determining nodes having a physical communication link with the node in a zone in which the particular node resides;
  b) determining an intra-zone routing table from the nodes determined to have a physical communication link with the node in the zone;
  c) for each zone in the network, determining zones having a virtual connection with the zone in the network; and
  d) determining an inter-zone routing table from the zones determined to have a virtual connection with the zone in the network.

* * * * *